(12) United States Patent
Yamashita et al.

(10) Patent No.: US 7,990,465 B2
(45) Date of Patent: Aug. 2, 2011

(54) IMAGING APPARATUS, IMAGING METHOD, STORAGE MEDIUM, AND INTEGRATED CIRCUIT

(75) Inventors: Haruo Yamashita, Osaka (JP); Takeshi Ito, Osaka (JP); Daisuke Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 445 days.

(21) Appl. No.: 12/209,458

(22) Filed: Sep. 12, 2008

(65) Prior Publication Data

US 2009/0231467 A1 Sep. 17, 2009

(30) Foreign Application Priority Data

Sep. 13, 2007 (JP) ................................. 2007-237730
Jun. 27, 2008 (JP) ................................. 2008-169430

(51) Int. Cl.
*H04N 5/238* (2006.01)
*H04N 5/20* (2006.01)
*H04N 5/243* (2006.01)

(52) U.S. Cl. ...................................... 348/365; 348/255

(58) Field of Classification Search ............... 348/229.1, 348/230.1, 254, 255, 256, 362, 363, 364, 348/365
See application file for complete search history.

(56) References Cited

U.S. PATENT DOCUMENTS

| | | | |
|---|---|---|---|
| 7,265,784 B1 * | 9/2007 | Frank ........................... | 348/222.1 |
| 2004/0207734 A1 * | 10/2004 | Horiuchi .................... | 348/229.1 |
| 2007/0229863 A1 * | 10/2007 | Ono et al. ..................... | 358/1.9 |
| 2009/0041350 A1 * | 2/2009 | Utagawa et al. .............. | 382/169 |
| 2009/0073278 A1 * | 3/2009 | Ogawa et al. ................ | 348/222.1 |

FOREIGN PATENT DOCUMENTS

| | | |
|---|---|---|
| WO | 2005/027041 | 3/2005 |
| WO | 2005/027043 | 3/2005 |

OTHER PUBLICATIONS

Haruo Yamashita et al., "Contrast-Gain Based Visual Tone Mapping for Digital Photo Prints", The Journal of Imaging Science and Technology, vol. 50, No. 5, pp. 458-468 (2006).

* cited by examiner

*Primary Examiner* — Jason Whipkey
(74) *Attorney, Agent, or Firm* — Wenderoth, Lind & Ponack, L.L.P.

(57) ABSTRACT

An imaging apparatus for capturing a moving image performs backlight correction of an image and outputs a natural image. The imaging apparatus electronically captures an image of a subject. An optical system has a light amount adjustment function. An imaging unit reads an optical image of the subject that is formed by the optical system. An A/D converter subjects an output of the imaging unit to A/D conversion. A backlight correction unit converts the tones of an image read by the A/D converter using a conversion characteristic selected differently according to a spatial position and at least increases the luminance level of a dark region of the image. An instruction unit instructs to start backlight correction. A control unit operates the backlight correction unit based on an instruction signal output from the instruction unit, and decreases an exposure light amount of the optical system by a predetermined amount.

16 Claims, 19 Drawing Sheets

| | Example setting 1 | Example setting 2 | Example setting 3 |
|---|---|---|---|
| Characteristic of LUT in the first visualization processing unit | Knee characteristic<br>Local contrast characteristic | Knee characteristic | Knee characteristic<br>Local contrast characteristic |
| Characteristic of LUT in the second visualization | Knee characteristic<br>Local contrast characteristic<br>Backlight correction characteristic | Knee characteristic<br>Local contrast characteristic | Knee characteristic<br>Backlight correction characteristic |

FIG. 16

IMAGING APPARATUS, IMAGING METHOD, STORAGE MEDIUM, AND INTEGRATED CIRCUIT

This application claims priority to Japanese Patent Application No. 2007-237730 filed on Sep. 13, 2007 and priority to Japanese Patent Application No. 2008-169430 filed on Jun. 27, 2008. The entire disclosure of Japanese Patent Application No. 2007-237730 filed on Sep. 13, 2007 and the entire disclosure of Japanese Patent Application No. 2008-169430 filed on Jun. 27, 2008 are hereby incorporated herein by reference.

BACKGROUND OF THE INVENTION

1. Field of the Invention

The present invention relates to an imaging apparatus that appropriately captures an image of a scene in which a main subject is dark and a scene with a large dynamic range, an imaging method used in the imaging apparatus, an integrated circuit that functions as the imaging apparatus, and a storage medium storing an imaging program used in the imaging apparatus.

2. Description of the Related Art

Imaging apparatuses, such as a digital still camera for capturing still images and a digital video camera for capturing moving images, capture images in the following manner. In an imaging apparatus, an optical system focuses light and forms an image through exposure control, and a solid-state image sensor, such as a CCD (charge-coupled device) image sensor or a CMOS (complementary metal oxide semiconductor) image sensor, converts the image to electric signals, which are analogue image signals. In the imaging apparatus, a circuit that performs signal processing, such as analogue front end processing, then processes the analogue image signals, and an A/D (analogue-to-digital) converter converts the analogue image signals to digital image data. The digital image data obtained by the imaging apparatus is subsequently subjected to image processing, such as video gamma correction (gamma correction with a gamma of 0.45), knee adjustment, luminance conversion, and color difference conversion. The processed digital image data is converted to data in a standardized format. More specifically, when the digital image data is still image data, the data is converted to, for example, JPEG (Joint Photographic Experts Group) data. When the digital image data is moving image data, the data is converted to, for example, MPEG (Moving Picture Experts Group) data or DV (Digital Video) data. The digital image data in the standardized format is recorded onto a recording medium, such as a memory card, a hard disk, an optical disc, or a magnetic tape.

The exposure light amount of the optical system (exposure light amount determined by the aperture value or the shutter speed) in the imaging apparatus (camera) is typically determined based on results of, for example, light amount detection units corresponding to a plurality of imaging areas into which the imaging surface is divided. When capturing an image of a backlit scene in which a main subject is dark, the imaging apparatus increases the luminance level of the captured image by setting a large aperture or setting a slow shutter speed and increasing the light exposure amount (increasing the amount of light entering the image sensor of the imaging apparatus). Also, the imaging apparatus performs processing to increase the luminance level of a captured image (backlit image) by converting the tones of the captured image using a tone curve (tone conversion characteristic) with which the luminance level of a dark region of the captured image (region with low tones) is increased.

When capturing an image of a backlit scene, which typically contains a dark backlit person as a main subject and a bright background such as sky, the imaging apparatus (camera) sets its exposure light amount in the manners (A) to (C) described below.

(A) The exposure light amount is set in a manner to prevent a sky region of a captured image from being overexposed and failing to reproduce color (to prevent the sky region from losing its tones) (the aperture is set smaller).

(B) The exposure light amount is set in a manner to expose a person region of a captured image with an optimum light amount (expose the person region to have appropriate tones (or luminance levels)) (the aperture is set larger).

(C) The exposure light amount is set as an intermediate value between the exposure light amounts set in the cases (A) and (B).

In the case (A), the captured image is in a severely backlit state. The person region of the captured image is extremely dark, whereas the sky region of the captured image is prevented from being overexposed and failing to reproduce color (the sky region of the captured image is prevented from losing its tones). In the case (B), the luminance level of the person region of the captured image is increased, whereas the sky region of the captured image is completely overexposed and fails to reproduce color. Both the images captured in the cases (A) and (B) are not favorable. To avoid such unfavorable images, the imaging apparatus usually uses the intermediate exposure light amount set in the case (C).

In the case (C), however, the sky region of the captured image is overexposed slightly, whereas the person region of the captured image is not sufficiently bright. The imaging apparatus fails to capture an image in which both the sky region and the person region have appropriate luminance levels in the case (C). In this manner, the imaging apparatus fails to capture an image with a satisfactory image quality even in the case (C).

The conventional imaging apparatus may also have a "backlight correction mode", which permits the user to explicitly choose the case (B). The conventional imaging apparatus with the backlight correction mode can increase the exposure light amount to the exposure light amount set in the case (B) as instructed by the user. The imaging apparatus with the backlight correction mode also recognizes a face and uses the luminance level of the face as a reference when determining the degree by which the exposure light amount is increased. In the image captured using the backlight correction mode, the person would be bright but the background would be completely overexposed and fail to reproduce color. As a result, the image captured using the backlight correction mode may fail to have a high image quality.

The technique of increasing the exposure light amount is not the only technique of backlight correction. Another backlight correction technique is to increase the luminance level of a dark region of a captured image by converting the tones of the captured image using tone curves (tone conversion characteristic curves). Such a backlight correction technique will now be described with reference to FIG. 18.

FIG. 18 shows the characteristics of backlight correction performed using conventional tone curves (tone conversion characteristic curves). In FIG. 18, the horizontal axis indicates the input luminance level, whereas the vertical axis indicates the output luminance level. The backlight correction needs a tone curve (tone conversion characteristic curve) with which the luminance level of a dark region is increased as indicated by arrows in FIG. 18.

With a tone curve (tone conversion characteristic curve) X, the luminance level of a dark region of a captured image is increased intensively while the luminance level of a bright region of the captured image is being unchanged. However, the backlight correction is not performed in an appropriate manner through the tone conversion performed using the tone curve X. The image resulting from the tone conversion performed using the tone curve X would be an unnatural image with an extremely low contrast of only intermediate tones (for example, the tones of an image region indicated by a circle drawn with a dotted line in FIG. 18) as shown in FIG. 2 of Non-Patent Citation 1.

With a tone curve Y, the tones of the entire image decrease. The image resulting from the tone conversion performed using the tone curve Y would be less unnatural. Thus, the backlight correction can be performed through the tone conversion using the tone curve Y. However, the tone conversion using the tone curve Y increases the luminance level of not only a dark backlit region of the captured image but also a bright region of the image. The tone conversion using the tone curve Y lowers the contrast of, for example, a background sky region of the captured image. As a result, the background sky region may easily be overexposed and fail to reproduce color (the tones of a highlight region, such as a sky region, may easily be saturated). The tone conversion (backlight correction) using the tone curve Y is practically possible only when the contrast of the captured image is lowered to a permissible level and the highlight region of the captured image is overexposed and fails to reproduce color at a permissible level. In other words, the tone conversion (backlight correction) using the tone curve Y is possible only when such tone conversion does not correspond to drastic correction but corresponds to moderate correction. The tone conversion (backlight correction) using the tone curve Y is possible within a range in which unnaturalness of the resulting image is permissible. Therefore, the tone conversion (backlight correction) using the tone curve Y cannot be used to perform drastic backlight correction.

Also, when the tone conversion is performed using a curve (tone conversion characteristic curve) with which the luminance level of not only a dark region but also an image region with an intermediate luminance level is increased, the image resulting from the tone conversion would be less unnatural. However, a highlight region of the image resulting from such tone conversion would be too bright in the same manner as in the case (B). For example, a sky region of the image resulting from the tone conversion performed using such a curve (tone conversion characteristic curve) may be overexposed and fail to reproduce color (a sky region may lose its tones). Also, the image resulting from such tone conversion may fail to have a sufficiently high contrast across the entire image. As a result, even the tone conversion (backlight correction) performed using the curve (tone conversion characteristic curve) with which the luminance level of not only a dark region but also an image region with an intermediate luminance level is increased cannot be used to perform drastic backlight correction.

To solve the above problem, one technique uses different tone conversion characteristics according to positions across an image. For example, an imaging apparatus with such a technique partially (or locally) increases the luminance level of a dark region of an image, such as a backlit person region of an image, by processing the dark region using a tone conversion characteristic different from a tone conversion characteristic used to process a sky region of the image for example. Such tone conversion (backlight correction) technique is known in the art as a visualization-characteristic-based technique (see FIGS. 3 to 5 of Non-Patent Citation 1, Patent Citation 1, and Patent Citation 2). Human eyes increase sensitivity when viewing a bright region and decrease sensitivity when viewing a dark region. The local backlight correction using such human eye's characteristics enables the contrast to be perceived by the human eyes, and enables visually natural processing to be performed. Such local backlight correction using the visualization-characteristic-based technique can therefore be used to perform drastic correction. Such local backlight correction enables the luminance level of an extremely dark person region of an image to be increased while maintaining the local contrast in the image.

Patent Citation 1 (International Publication No. WO 2005/027041) describes one such technique. More specifically, the patent document describes a technique for using a region surrounding a processing target pixel of an image. With this technique, for example, the histogram of a region surrounding a processing target pixel of an image is measured, and the tone curve (tone conversion characteristic curve) used for the target pixel is determined based on the distribution of values of the histogram. Alternatively, the average luminance level of the region surrounding the processing target pixel is calculated, and the tone curve (tone conversion characteristic curve) used for the target pixel is determined according to the luminance level of the region surrounding the processing target pixel.

Non-Patent Citation 1: "Contrast-Gain Based Visual Tone Mapping for Digital Photo Prints", Yamashita et al., The Journal of Imaging Science and Technology, vol. 50, no. 5, pp. 458-468 (2006).

Patent Citation 1: International Publication No. WO 2005/027041

Patent Citation 2: International Publication No. WO 2005/027043

SUMMARY OF THE INVENTION

Technical Problem

However, the visualization-characteristic-based technique has two problems described below.

The first problem is associated with the fact that the technique is effective only when an input signal is not saturated. This technique alone cannot be used to perform appropriate tone conversion (for example, backlight correction) when an input signal is already saturated.

The second problem is associated with the fact that the optical system control (the exposure light amount control based on the aperture value) is not designed to use in an interrelated manner with the image processing. Moreover, the local correction described above, which is achieved based only on the captured image data, is not always interrelated with the control of the optical system included in the imaging apparatus. The side effects caused by this correction now be described.

The imaging apparatus is now assumed to capture a moving image. When the exposure light amount is changed optically, the correction curve is usually changed in the digital processing at a timing delayed with respect to the timing at which the optical system is driven. If the imaging apparatus simply starts the aperture control at the same timing as when turning on the local backlight correction, the imaging apparatus requires a certain time before decreasing the aperture until the exposure light amount reaches a predetermined light amount. As a result, the backlight correction is performed unnecessarily during the time required to decrease the aperture to reach the predetermined light amount. In this case, the backlit person region of the captured image is brightened excessively at the timing when the local backlight correction is turned on (at the timing when the local backlight correction is started) and then is darkened gradually to an appropriate luminance level and is maintained at the appropriate luminance level.

The person is once brightened excessively and then is gradually darkened to an appropriate luminance level. Such changes of the luminance level of the captured image (captured moving image) are perceived unnatural by the user.

The person region of the captured image (captured moving image) is once brightened excessively and is then darkened gradually. In this case, the user does not perceive the increased luminance level of the brightened person region of the captured image (captured moving image) with respect to the uncorrected image. In other words, the effect of the backlight correction is not easily perceivable by human eyes.

The operation reverse to the operation described above is performed when the local backlight correction is turned off. The side effects of the correction described above are mere examples of the side effects produced when the local backlight correction is turned on and off manually. The same side effects as described above are also produced when the exposure light amount is changed either rapidly or discretely.

The inventors of the present invention are the first to find such side effects through experiments. Such side effects are unique to the local backlight correction, which is performed particularly by changing the exposure light amount.

It is therefore an object of the present invention to provide an imaging apparatus with a backlight correction function that captures an image of a scene including, for example, a backlit person with a specific background, such as a blue sky background, in a manner to prevent a sky region of the image from being saturated and increase the luminance level of a person region of the image by controlling operation timings or control amounts of an optical system control unit (functional unit for controlling an optical system) and an image processing unit (functional unit for performing image processing) in an interrelated manner, an imaging method, a storage medium storing an imaging program, and an integrated circuit.

It is another object of the present invention to provide an imaging apparatus or the like that consecutively captures images and forms a moving image of a scene including a backlit person in a manner that a backlit person region of the captured moving image is perceived to have naturally changing tones through interrelated control of the operation timings or control amounts of an optical system control unit and an image processing unit.

Technical Solution

A first aspect of the present invention provides an imaging apparatus that electronically captures an image of a subject. The imaging apparatus includes an optical system, an imaging unit, a backlight correction unit, an instruction unit, and a control unit.

The imaging unit reads an optical image of the subject that is formed with light focused by the optical system, and obtains the read optical image as an image signal. The backlight correction unit performs backlight correction of the image signal by performing tone conversion of converting a tone of a processing target pixel that is included in an image formed by the image signal using a conversion characteristic that is selected differently according to a spatial position of the processing target pixel in the image. The tone conversion is performed in a manner to at least increase a luminance level of a dark image region of the image. The instruction unit outputs an instruction signal instructing to start the backlight correction performed by the backlight correction unit. The control unit starts the backlight correction based on the instruction signal output from the instruction unit, and adjusts an amount of light in the optical system by decreasing an exposure light amount of the imaging unit by a predetermined amount.

The term "at least" herein means not only to increase the luminance level of the dark image region but also to, for example, decrease the luminance level of a bright image region.

The term "exposure" herein refers to expose a film to a certain amount of light. The amount of such light is referred to as the "exposure light amount" or the "exposure amount", which is expressed as an exposure value (EV). The EV is determined by a combination of the aperture value, the shutter speed, and the ISO speed. The light amount adjustment is performed in the optical system based on such exposure settings.

The term "decreasing an exposure light amount by a predetermined amount" refers to decreasing the EV by a predetermined amount from the value set in normal image formation (without backlight correction). Decreasing the EV to −1, −2, etc. increases the dynamic range twofold, fourfold, etc. The effect of preventing a signal with a high luminance level corresponding to, for example, a sky region, from being saturated is greater as the EV is set smaller. The "predetermined amount" herein may be set in advance. However, it is preferable to calculate an appropriate value as the predetermined amount in a manner to prevent the sky region from being saturated based on "sky detection" and "peak detection", which will be described later. It is preferable to set the maximum degree by which the EV is decreased because noise affects more as the EV value is decreased more.

The "instruction signal" of the "instruction unit" may be generated in response to an instruction from the user (in response to manual on and off of the backlight correction), or may be generated automatically based on the sky detection, peak detection, or face detection. Alternatively, the backlight correction may be set constantly on. In this case, it is only required that the aperture be decreased when the effect is greater than 0.

In this imaging apparatus, the control unit enables the control of the optical system and the control (backlight correction) of the image processing to be executed in an interrelated manner. Also, the backlight correction unit performs the tone conversion using a conversion characteristic that is selected differently according to a spatial position of the target pixel in the image. This structure enables each image region with a different luminance level (for example, a dark image region or a bright image region) to be subjected to different tone conversion. As a result, the imaging apparatus performs backlight correction suitable for the visualization characteristics of humans. More specifically, the imaging apparatus performs the backlight correction of an image including, for example, a backlit person with a specific background, such as a blue sky background, in a manner to prevent a sky region of the image from being saturated and increase the luminance level of a person region of the image by controlling operation timings or control amounts of its optical system control unit (functional unit for controlling an optical system) and its image processing unit (functional unit for performing image processing) in an interrelated manner.

A second aspect of the present invention provides the imaging apparatus of the first aspect of the present invention in which the control unit gradually increases a level of an effect adjustment signal for adjusting an intensity of the backlight correction performed by the backlight correction unit by gradually increasing a correction amount of the backlight correction unit according to the decrease amount of the exposure light amount of the optical system. The backlight correction unit performs the backlight correction with the intensity adjusted based on the effect adjustment signal.

The imaging apparatus increases the correction amount of the local backlight correction (the degree by which the luminance level of the dark region of the image is increased) according to the decrease amount of the exposure light amount of the optical system. This corrects the luminance level of the dark region (such as a backlight person region) to an appropriate luminance level and prevents the bright region (such as a sky region) from being overexposed and failing to reproduce color. In other words, the imaging apparatus controls the correction amount of the local backlight correction in a direction in which the local backlight correction will compensate for a decrease in the luminance level of the captured image that occurs when the exposure light amount of the optical system decreases. As a result, all image regions of the image captured by the imaging apparatus have appropriate luminance levels. The imaging apparatus can perform the backlight correction in an appropriate manner.

The imaging apparatus gradually decreases the correction amount, and enables the luminance level of the bright image region and the luminance level of the dark image region to change in an interrelated manner. More specifically, the sky image region is darkened gradually without being overexposed and failing to reproduce color, and at the same time the person image region is brightened gradually. In this manner, the effect of the image processing is perceived as a natural change. Also, the effect of the imaging processing is easily perceived (recognized) by the user.

This structure eliminates the side effects caused by mechanical delay of the optical system, which have been found first by the inventors of the present invention, and enables the exposure light amount and the correction amount to be changed freely. This consequently enables the effect of the local backlight correction to be increased further.

The correction amount may be changed gradually with various methods described below.

(1) When the real exposure value reflecting the mechanical delay (hereafter referred to as the "real exposure value") can be obtained, the correction amount can be calculated simply based on the real exposure value. This enables the backlight correction to be performed in a manner interrelated completely with the mechanical delay.

(2) When the real exposure value cannot be obtained, the real exposure value may be calculated based on the mechanical delay characteristics of the optical system, which are known in the art, and a target exposure value. This enables the backlight correction to be performed in a manner interrelated completely with the mechanical delay.

(3) When the mechanical delay characteristics are expressed using a complex formula, the target exposure value may simply be smoothed through, for example, filtering. Filtering may be performed using a low-pass filter, such as an IIR (infinite impulse response) low-pass filter. The filter used may be any filter that can gradually change the exposure light amount, such as an FIR (finite impulse response) low-pass filter, or a linear filter that performs linear interpolation. In this case, the simple structure enables the backlight correction to be performed in a manner interrelated with the mechanical delay although there still exists a permissible time lag.

(4) The effect adjustment signal can be calculated based on the photometric value. The photometric value reflects the mechanical delay. Thus, the effect adjustment signal calculated based on the photometric value automatically changes gradually. In this case, the simple structure enables the backlight correction to be performed in a manner interrelated with the mechanical delay although there still exists a permissible time lag.

(5) The effect adjustment signal may be calculated based on the average value of image signals or the average value of vicinity luminance levels of each pixel. Such average values reflect the mechanical delay in the same manner as the photometric value. Thus, the effect adjustment signal calculated based on the average value of the image signals or the average value of the vicinity luminance levels automatically changes gradually. In this case, substantially the simple structure enables the backlight correction to be performed in a manner interrelated with the mechanical delay.

A third aspect of the present invention provides the imaging apparatus of the second aspect of the present invention in which the control unit estimates the exposure light amount $\hat{A}(t)$ using the following formula: $\hat{A}(t)=\hat{A}(t-1)+\alpha*(A(t)-\hat{A}(t-1))$, where $A(t)$ is a set exposure amount of the optical system and $\alpha$ is a predetermined time constant, and $0 \leq \alpha \leq 1$. The control unit calculates the effect adjustment signal $H(t)$ using the following formula: $H(t)=H0+(1-H0)*(\Delta\hat{A}(t)/\Delta A max)$, where $\Delta\hat{A}(t)$ is the decrease amount of the exposure light amount and $\Delta A max$ is a predetermined maximum decrease amount of the exposure light amount, and $H0$ is a value of the effect adjustment signal when $\Delta\hat{A}(t)=0$.

The "set exposure amount" herein refers to the exposure light amount determined based on the set EV. However, the set EV is not directly reflected in the real exposure amount. The real exposure amount changes to follow the set exposure light amount with a delay caused by mechanical delay of the optical system. The set exposure light amount $A(t)$ is changed gradually by processing the set exposure light amount $A(t)$ through an IIR low-pass filter to estimate the real exposure light amount of the optical system. It is only required that the time constant $\alpha$ be tuned according to the mechanical delay characteristics of the optical system.

The predetermined maximum decrease amount $\Delta A max$ of the decrease amount $\Delta\hat{A}(t)$ of the exposure light amount is normalized and used as the effect adjustment signal. The effect adjustment may be performed within a range of $(1-H0)$ using the value of $H0$ (where $0 \leq H0 \leq 1$) as a reference in a manner that the backlight correction is effective even when $\Delta\hat{A}(t)=0$ (when the exposure light amount is not decreased).

The exposure light amount may be processed through the IIR low-pass filter at any timing. For example, the effect adjustment signal $H(t)$ may be processed through the IIR low-pass filter.

A fourth aspect of the present invention provides the imaging apparatus of the first aspect of the present invention that further includes a photometry unit. The photometry unit generates a photometric value indicating an amount of light that is received by the imaging unit. The control unit generates an effect adjustment signal for adjusting an intensity of the backlight correction performed by the backlight correction unit based on the photometric value. The backlight correction unit performs the backlight correction with the intensity determined based on the effect adjustment signal.

The photometric value reflects the mechanical delay. Thus, the effect adjustment signal calculated based on the photometric value automatically changes gradually. In this case, the simple structure enables the local backlight correction to be performed in a manner interrelated with the control of the optical system.

A fifth aspect of the present invention provides the imaging apparatus of the fourth aspect of the present invention in which the control unit calculates the effect adjustment signal H(t) using the following formula: H^(t)=H0+(1−H0)*(ΔP(t)/ΔPmax), where ΔP(t) is a decrease amount of the photometric value and ΔPmax is a predetermined maximum decrease amount of the photometric value, and H0 is a value of the effect adjustment signal when ΔP(t)=0.

As described above, the photometric value reflects the mechanical delay. Thus, the photometric value is simply required to be normalized. This easily enables the local backlight correction to be performed in a manner interrelated with the control of the optical system.

A sixth aspect of the present invention provides the imaging apparatus of one of the second to fifth aspects of the present invention in which the backlight correction unit performs the backlight correction by outputting an output image signal Yout calculated using the following formula: Yout=(1−H)*Yin1+H*Yin2, where Yin1 is an uncorrected image signal that is the image signal yet to be subjected to backlight correction, Yin2 is a corrected image signal that is the image signal already subjected to backlight correction, and H is the effect adjustment signal, when the backlight correction unit receives the uncorrected image signal Yin1, the corrected image signal Yin2, and the effect adjustment signal H, and the effect adjustment signal H has an real value ranging from 0 to 1.

This enables the effect of the backlight correction to be adjusted easily through interior-division processing by changing the value of the effect adjustment signal.

To completely eliminate the change in the exposure light amount using the effect adjustment signal, it is only required that the equation 1 shown in FIG. 19 be solved. The equation includes gamma correction or nonlinearity due to backlight correction. Thus, the equation 1 may be solved using, for example, approximation, or may be solved numerically by, for example, converging the evaluation functions through minimization (or maximization).

A seventh aspect of the present invention provides the imaging apparatus of one of the second to fifth aspects of the present invention in which the backlight correction unit adjusts an intensity of only a backlight correction function of a two-dimensional lookup table 2 by outputting an output image signal Yout calculated using the following formula: Yout=(1−H)*LUT1(Yin, Yave)+H*LUT2(Yin, Yave), where Yin is a luminance level of the target pixel, LUT1(Yin, Yave) is an output signal of a two-dimensional lookup table 1 that has no backlight correction function, Yave is a vicinity luminance level that is a luminance level of a region surrounding the target pixel and is input into the two-dimensional lookup table 1, LUT2(Yin, Yave) is an output signal of the two-dimensional lookup table 2 that has a backlight correction function, and H is the effect adjustment signal, and 0≦H≦1.

The visualization-characteristic-based processing performed using a single LUT may include not only the dark region correction (backlight correction) function but may include a plurality of functions, such as bright region correction (knee correction) or local contrast correction. The result of processing performed using an LUT with the backlight correction function and the result of processing performed using an LUT without the backlight correction function may be subjected to interior-division. This enables the effect adjustment with only the backlight correction function to be performed while maintaining the effect of the other functions.

Although the imaging apparatus includes the two LUTs described above, the imaging apparatus may use three or more LUTs. The LUTs used in the imaging apparatus should not be limited to the LUTs with and without the backlight correction function. The imaging apparatus may combine LUTs with different functions. For example, the imaging apparatus may combine LUTs with different functions as shown in FIG. 16.

An eighth aspect of the present invention provides the imaging apparatus of one of the first to seventh aspects of the present invention that further includes a noise-reduction processing unit. The noise-reduction processing unit performs noise-reduction processing of reducing noise of the image signal or an output image signal of the backlight correction unit. The control unit gradually increases an intensity of the noise-reduction processing unit according to the decrease amount of the exposure light amount of the optical system.

Noise increases more as the exposure light amount is decreased more and the level of the effect adjustment signal is increased more. It is therefore preferable to increase the intensity of the noise-reduction processing according to the decrease amount of the exposure light amount. This enables the noise-reduction processing to be performed in a manner interrelated with noise.

A ninth aspect of the present invention provides the imaging apparatus of the eighth aspect of the present invention in which the backlight correction unit calculates a vicinity luminance level that is a luminance level of a region surrounding the target pixel. The noise-reduction processing unit further increases an intensity of the noise-reduction processing of a pixel whose vicinity luminance level is low.

Noise is normally more visible in a darker image region. The use of the vicinity luminance level increases the intensity of the noise-reduction processing only in a dark region. This prevents the side effects in which regions other than the dark region are blurred unnecessarily.

A tenth aspect of the present invention provides the imaging apparatus of one of the first and ninth aspects of the present invention that further includes a peak detection unit. The peak detection unit detects a peak luminance level of the image formed by the image signal based on the image signal. The control unit decreases the exposure light amount of the imaging unit by adjusting the light amount of the optical system at least according to the peak luminance level detected by the peak detection unit.

When, for example, an image signal is an 8-bit signal, the exposure light amount is decreased until the peak value becomes less than 255. It is preferable to set the maximum decrease amount of the exposure light amount because noise affects greatly when the exposure light amount is decreased excessively.

This enable the control of the optical system and the control of the image processing to be performed in an interrelated manner based on the peak luminance level of the image. As a result, the backlight correction is performed with a higher precision.

An eleventh aspect of the present invention provides the imaging apparatus of one of the first and tenth aspects of the present invention that further includes a sky detection unit. The sky detection unit extracts an image region indicating sky from the image formed by the image signal. The control unit decreases the exposure light amount of the imaging unit by adjusting the light amount of the optical system at least according to a luminance level of the image region indicating the sky detected by the sky detection unit.

In the same manner as for the peak value, the exposure light amount is decreased until the luminance level of the sky image region becomes less than 255. It is preferable to set the maximum decrease amount of the exposure light amount because noise affects greatly when the exposure light amount is decreased excessively.

To detect the sky, the input image may for example be divided in red (R), green (G), and blue (B) blocks. A block with a luminance level Y and a color difference of B and Y that are both greater than predetermined values can be determined as an image region indicating sky. An average luminance value of the block determined as the image region indicating the sky may be used as the luminance level of the image region indicating the sky.

In many cases, a signal with a high luminance level that the user wants to capture is a signal corresponding to sky. This structure decreases the exposure light amount only when the sky is overexposed and fails to reproduce color. Also, this structure enables the control of the optical system and the control of the imaging processing to be performed in an interrelated manner while considering the sky image region (highlight image region). As a result, the backlight correction is performed with a higher precision.

A twelfth aspect of the present invention provides the imaging apparatus of one of the first and eleventh aspects of the present invention that further includes a face detection unit. The face detection unit extracts a face region indicating a face of a person from the image formed by the image signal. The control unit changes an intensity of correction performed by the backlight correction unit at least according to a luminance level of the face region detected by the face detection unit.

When, for example, the face region is dark, the correction intensity may be increased. When the face region originally has an appropriate luminance level, the correction intensity may be set substantially 0.

In many cases, a subject that the user wants to capture as a bright image region is a person. Increasing the luminance level of regions other than the person region may only make noise visible. This structure enables the effect of the backlight correction function only when the person region is dark. Also, this structure enables the control of the optical system and the control of the imaging processing to be performed in an interrelated manner while considering the face image region. As a result, the backlight correction is performed with a higher precision.

A thirteenth aspect of the present invention provides the imaging apparatus of one of the fourth to twelfth aspects of the present invention in which the photometry unit divides the image formed by the image signal into a plurality of image regions, and measures a light amount corresponding to each image region to generate the photometric value indicating the amount of light received by the imaging unit and determine a reference exposure amount for adjusting the light amount of the optical system. The control unit changes a photometric weight used to weight each image region based on an instruction signal output from the instruction unit and obtains the photometric value, and adjusts the light amount of the optical system based on the obtained photometric value.

A typical imaging apparatus (camera) does not have the local backlight correction function and has no means of reducing the overexposure of the sky. To expose a person region of the image with an appropriate luminance level, such an imaging apparatus without the local backlight correction reduces a photometric weight used to weight an upper region of the screen (an image region that is likely to be a sky region) relative to the photometric weight used to weight other regions.

The imaging apparatus of the present invention has the local backlight correction function. Thus, it is preferable to change the photometric weight to prevent the sky region from being overexposed and failing to reproduce color. For example, the imaging apparatus may set the photometric weight used to weight an upper region of the screen larger than the photometric weight used to weight the other regions. This automatically adjusts the exposure light amount to prevent the sky region from being overexposed and failing to reproduce color, and eliminates the need for the peak detection and the sky detection and prevents the overexposure of the sky region in a simple manner.

A fourteenth aspect of the present invention provides an imaging method used in an imaging apparatus that includes an optical system with a light amount adjustment function operable to focus light from a subject and an imaging unit operable to read an optical image of the subject that is formed with the light focused by the optical system and obtain the read optical image as an image signal. The method includes a backlight correction process, an instruction determination process, and a control process.

In the backlight correction process, backlight correction of the image signal is performed by performing tone conversion of converting a tone of a processing target pixel that is included in an image formed by the image signal using a conversion characteristic that is selected differently according to a spatial position of the processing target pixel in the image. The tone conversion is performed in a manner to at least increase a luminance level of a dark image region of the image. In the instruction determination process, whether an instruction signal instructing to start the backlight correction performed in the backlight correction process is received is determined. In the control process, the backlight correction is started in the backlight correction process based on the instruction signal output in the instruction determination process, and an amount of light in the optical system is adjusted by decreasing an exposure light amount of the imaging unit by a predetermined amount.

The imaging method has the same advantageous effects as the imaging apparatus of the first aspect of the present invention.

A fifteenth aspect of the present invention provides a storage medium storing a program enabling a computer to implement an imaging method used in an imaging apparatus that includes an optical system with a light amount adjustment function operable to focus light from a subject and an imaging unit operable to read an optical image of the subject that is formed with the light focused by the optical system and obtain the read optical image as an image signal. The program enables the computer to perform a backlight correction process, an instruction determination process, and a control process.

In the backlight correction process, backlight correction of the image signal is performed by performing tone conversion of converting a tone of a processing target pixel that is included in an image formed by the image signal using a conversion characteristic that is selected differently according to a spatial position of the processing target pixel in the image. The tone conversion is performed in a manner to at least increase a luminance level of a dark image region of the image. In the instruction determination process, whether an instruction signal instructing to start the backlight correction performed in the backlight correction process is received is determined. In the control process, the backlight correction is started in the backlight correction process based on the instruction signal output in the instruction determination process, and an amount of light in the optical system is adjusted by decreasing an exposure light amount of the imaging unit by a predetermined amount.

The storage medium storing the program has the same advantageous effects as the imaging apparatus of the first aspect of the present invention.

A sixteenth aspect of the present invention provides an integrated circuit used in an imaging apparatus that includes an optical system with a light amount adjustment function operable to focus light from a subject and an imaging unit operable to read an optical image of the subject that is formed with the light focused by the optical system and obtain the read optical image as an image signal. The integrated circuit includes a backlight correction unit, an instruction unit, and a control unit.

The backlight correction unit performs backlight correction of the image signal by performing tone conversion of converting a tone of a processing target pixel that is included in an image formed by the image signal using a conversion characteristic that is selected differently according to a spatial position of the processing target pixel in the image. The tone conversion is performed in a manner to at least increase a luminance level of a dark image region of the image. The instruction unit outputs an instruction signal instructing to start the backlight correction performed by the backlight correction unit. The control unit starts the backlight correction based on the instruction signal output from the instruction unit, and adjusts an amount of light in the optical system by decreasing an exposure light amount of the imaging unit by a predetermined amount.

The integrated circuit has the same advantageous effects as the imaging apparatus of the first aspect of the present invention.

Advantageous Effects

The present invention provides an imaging apparatus with a backlight correction function that captures an image of a scene including, for example, a backlit person with a specific background, such as a blue sky background, in a manner to prevent a sky region of the image from being saturated and increase a luminance level of a person region of the image by controlling operation timings or control amounts of an optical system control unit (functional unit for controlling an optical system) and an image processing unit (functional unit for performing image processing) in an interrelated manner, an imaging method, a storage medium storing an imaging program, and an integrated circuit.

The present invention further provides an imaging apparatus or the like that consecutively captures images and forms a moving image of a scene including a backlit person in a manner that a backlit person region of the captured moving image is perceived to have naturally changing tones through interrelated control of the operation timings or control amounts of an optical system control unit and an image processing unit.

BRIEF DESCRIPTION OF THE DRAWINGS

FIG. 16 shows example settings of tone conversion characteristics of a two-dimensional LUT 442 used in the first visualization processing unit 404 and a two-dimensional LUT 452 used in the second visualization processing unit 405.

Figure 1:
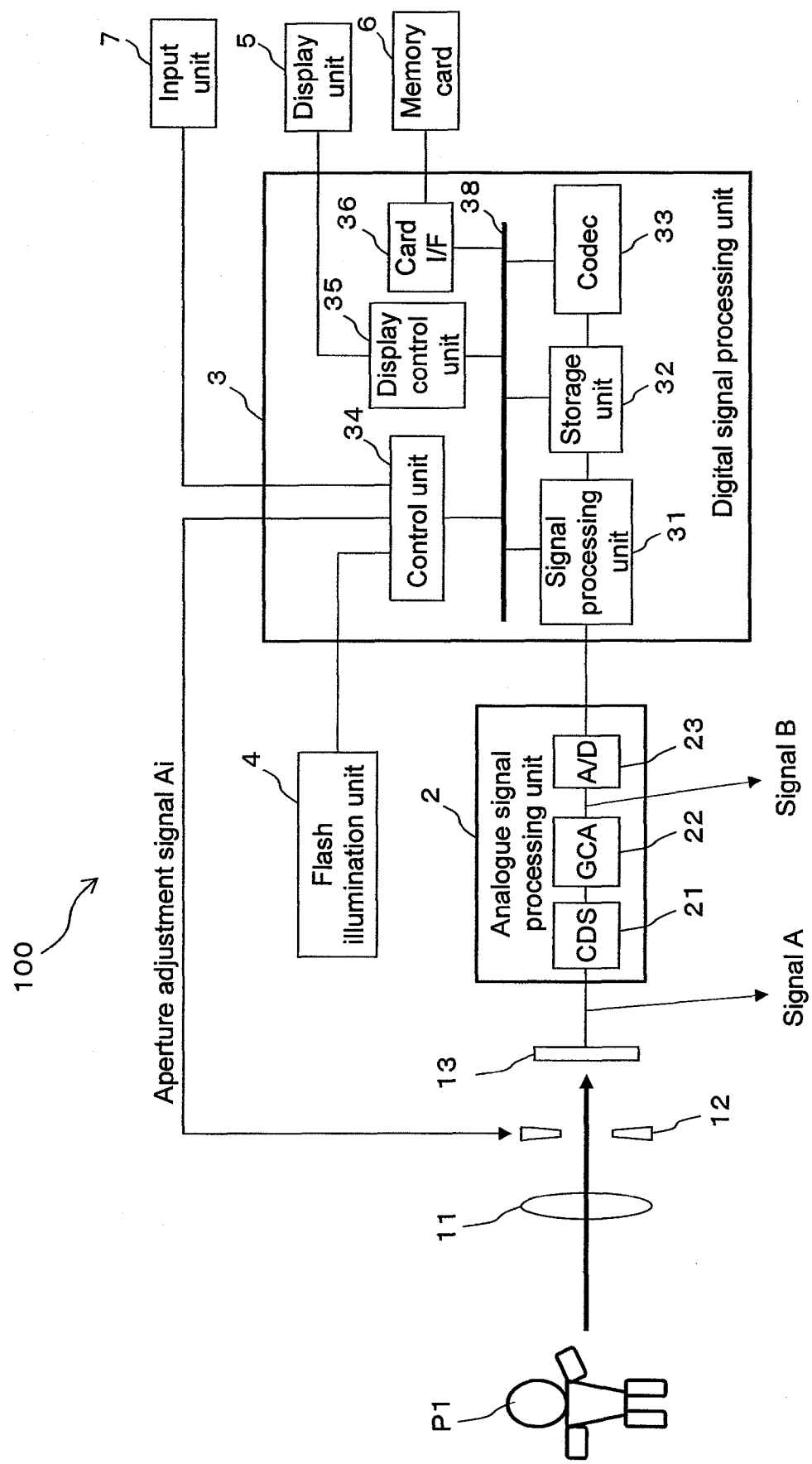
FIG. 1 shows the structure of an imaging apparatus according to a first embodiment of the present invention.

EXPLANATION OF REFERENCE 100 imaging apparatus
2 analogue signal processing unit
3 digital signal processing unit
7 input unit
31, 31A, 31B, 31C, 31D signal processing unit
34 control unit
11 imaging lens
12 aperture
13 imaging unit
41 subject
101 local backlight correction unit
102A first signal processing unit
102B second signal processing unit
103, 402, 406 interior-division circuit (interior-division processing unit)
104 photometry unit
105 peak detection unit
106 face detection unit
107 sky detection unit 111, 401 vicinity luminance detection unit
112 dynamic tone correction unit
201 image characteristic amount extraction unit
400B, 400C, 400D visualization processing unit
404 first visualization processing unit
405 second visualization processing unit

BEST MODE FOR CARRYING OUT THE INVENTION

An imaging apparatus, an imaging method, and an integrated circuit that functions as an imaging apparatus according to an embodiment of the present invention will now be described with reference to the drawings.

First Embodiment 1.1 Structure of the Imaging Apparatus

FIG. 1 shows the schematic structure of an imaging apparatus 100 according to a first embodiment of the present invention.

The imaging apparatus 100 includes an optical system (an imaging lens 11, an aperture 12, an imaging unit 13, a flash illumination (strobe light) unit 4), an analogue signal processing unit 2, and a digital signal processing unit 3. The imaging apparatus 100 also includes a memory card 6, a display unit (for example a liquid crystal display) 5, and an input unit (user interface) 7, which may be modified freely. The imaging apparatus 100 also includes a bus 38, which connects the functional units of the digital signal processing unit 3. In the present embodiment, the functional units of the digital signal processing unit 3 are connected by the bus 38 as shown in FIG. 1. However, the functional units of the digital signal processing unit 3 may not necessarily be connected via the bus but may be connected directly to one another. It is only required that the functional units of the digital signal processing unit 3 can transmit and receive necessary data (signals) to and from one another.

The optical system includes the imaging lens 11, the aperture 12, the imaging unit 13, and the flash illumination (strobe light) unit 4. The imaging unit 13 includes an image sensor.

The imaging lens 11 focuses reflection light from a subject P1, and forms an image of the subject P1 onto an imaging surface of the image sensor included in the imaging unit 13. The amount by which the imaging lens 11 moves back and fourth on the optical axis of the imaging lens 11 is controlled with the autofocusing function or the manual focusing function of the imaging apparatus 100.

The aperture 12 receives an aperture adjustment signal output from a control unit (for example, a control microcomputer (microprocessor)) 34, and changes the aperture amount of the aperture 12. This adjusts the amount of light received by the image sensor of the imaging unit 13 (light amount adjustment function).

The imaging unit 13 includes the image sensor. The image sensor of the imaging unit 13 is, for example, a CCD image sensor or a CMOS image sensor with a single-sensor structure that includes separate R, G, and B color filters. The image sensor converts an image that is formed on the imaging surface to an analogue electric signal (an analogue image signal) corresponding to a predetermined number of pixels (for example, 2048 by 1536 pixels) through photoelectric conversion according to the amount of received light, and outputs the analogue electric signal to the analogue signal processing unit 2. In FIG. 1, a signal A indicated with an arrow is the signal output from the image sensor included in the imaging unit 13. Symbol A indicates the level of the signal.

The analogue signal processing unit 2 receives an analogue signal (analogue image signal) representing image data output from the imaging unit 13. The analogue signal processing unit 2 subjects the analogue signal to predetermined signal processing, samples the image data, and outputs the data to the digital signal processing unit 3 as a digital image signal. The analogue signal processing unit 2 includes a correlated double sampling (CDS) unit 21, an analogue amplifier circuit 22 (gain control amplifier (GCA)) 22, and an analogue-to-digital (A/D) converter 23.

The CDS unit 21 receives an analogue image signal output from the image sensor of the imaging unit 13, and removes noise from the analogue image signal and outputs the resulting signal to the analogue amplifier circuit 22.

The analogue amplifier circuit 22 receives a signal output from the GCA 22, and amplifies (adjusts) the signal level of the signal output from the GCA 22 to a predetermined level and outputs the signal to the A/D converter 23. In FIG. 1, a signal B indicated using an arrow is the signal amplified by the GCA 22. Symbol B indicates the level of the signal.

The A/D converter 23 receives a signal output from the GCA 22, and converts the signal output from the GCA 22 to a digital signal (digital image signal) through A/D conversion. The A/D converter 23 outputs a digital signal (digital image signal) resulting from the A/D conversion to the digital signal processing unit 3. More specifically, the A/D converter 23 converts an output signal of the GCA 23 to digital image data with a predetermined quantization precision and sampling precision (for example, to a 12-bit digital signal with 4096 tones), and outputs the resulting data to the digital signal processing unit 3.

The digital signal processing unit 3 includes the signal processing unit 31, the storage unit (memory) 32, the control unit (control microcomputer) 34, and a codec (coder/decoder) 33. The digital signal processing unit 3 includes a card I/F 36 and a display control unit (LCD control circuit) 35, which may be modified freely.

The signal processing unit 31 receives a digital image signal output from the analogue signal processing unit 2, and subjects the input digital image signal (digital image data) to backlight correction. The signal processing unit 31 writes the processed (or unprocessed) image data (digital image signal) to the storage unit (memory) 32.

The storage unit (memory) 32 stores the digital image signal (digital image data) based on an instruction provided from the control unit 34. More specifically, the storage unit 32 stores output values (for example, image data) of the processing units that are output when the storage unit 32 is controlled to write the values by the control unit 34, and outputs values stored at memory addresses designated based on a read control signal provided from the control unit 34.

The codec 33 codes the image data (digital image signals) stored consecutively in the storage unit (memory) 32. The codec 33 may be, for example, an MPEG (Moving Picture Experts Group) coder/decoder. More specifically, the codec 33 codes the image data by compressing the data according to a predetermined format (for example, according to MPEG), and outputs the coded video data.

The control unit 34 (for example, the control microcomputer) receives an output value from the signal processing unit 31 or from the input unit 7 etc. directly or via the storage unit (memory) 32, and outputs a control signal to control the aperture 12. Also, the control microcomputer 34 attaches header information to the coded image data. The control microcomputer 34 writes the image data with the header information as an Exif (Exchangeable image file) to the memory card 6 via the card I/F 36.

The display control unit (for example, the LCD control circuit) 35 obtains the image data stored in the memory card 6 (or the image data stored in the storage unit (memory) 32), and drives the display unit 5 based on the obtained image data. The display unit 5 may be, for example, a liquid crystal display (LCD). The display unit (for example, LCD) 5 displays a preview image (referred to as a "live view") of a scene whose image is to be captured using the imaging apparatus 100.

Figure 2:
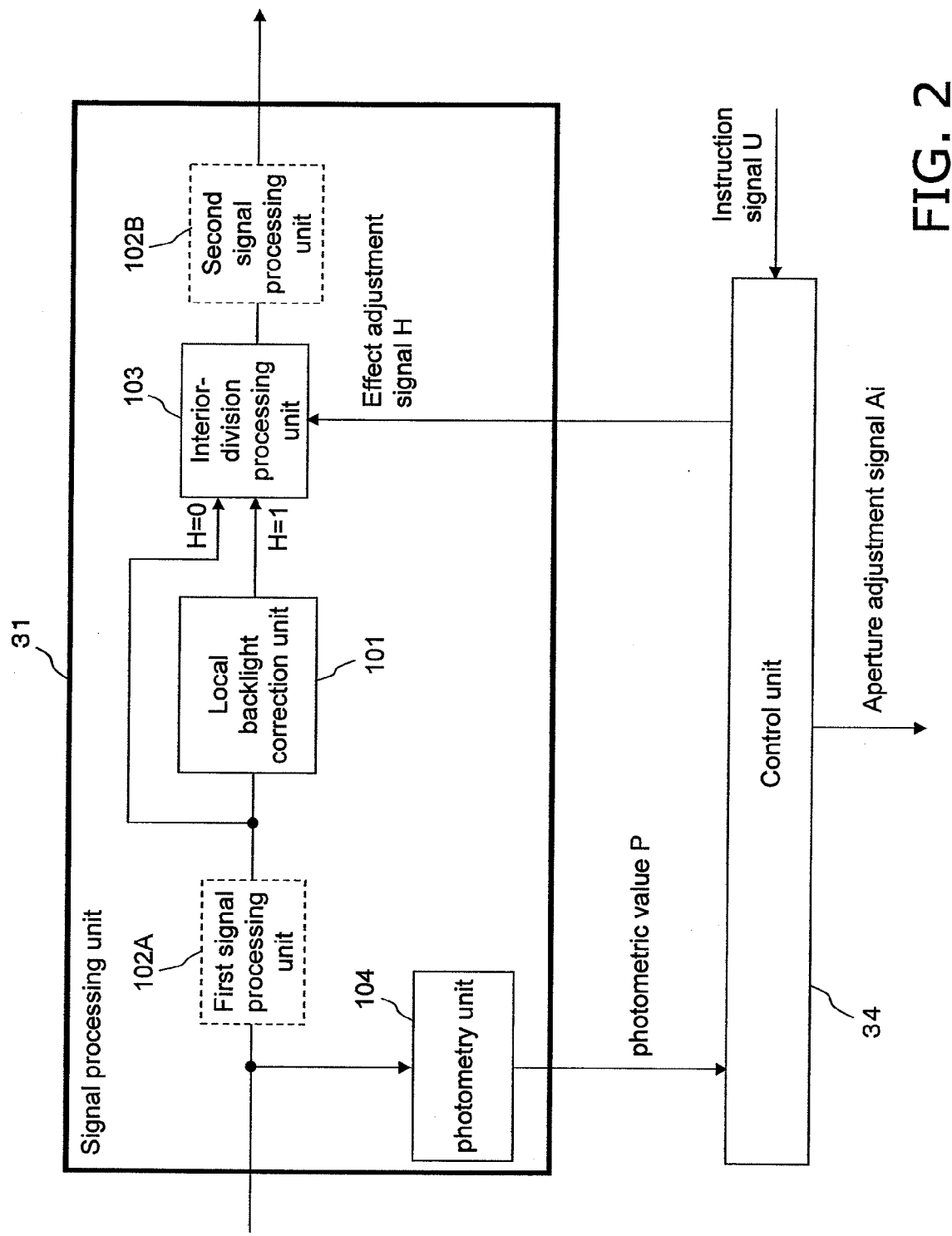
FIG. 2 is a block diagram of a signal processing unit 31 and a control unit 34 included in the imaging apparatus according to the first embodiment.

FIG. 2 is a functional block diagram of the signal processing unit (signal processing circuit) 31 according to the present embodiment.

The signal processing unit 31 includes a photometry unit 104, a first signal processing unit (first signal processing circuit) 102A, a local backlight correction unit 101, an interior-division processing unit (interior-division circuit) 103, and a second signal processing unit (second signal processing circuit) 102B. These functions may be realized using a special digital signal processor (DSP) arranged in the signal processing circuit, or may be realized by the control unit (control microcomputer) 34 executing software (programs) implementing the above functions.

The photometry unit 104 receives image data (digital image signal) output from the analogue signal processing unit 2. The photometry unit 104 divides the image data into a plurality of image data pieces as necessary (the image data pieces form image regions (divisional image regions) into which an image formed using the image data is divided). The photometry unit 104 extracts information about the luminance level of the entire image that is formed using the image data, and outputs the extracted luminance information to the control unit 34 as a photometric value P. More specifically, the photometry unit 104 divides the image that is formed using the image data into a plurality of image regions, and weights image data (digital image signal) corresponding to each divisional image region with a predetermined weight (photometric weight), and calculates an average weighted value of the image data. The photometry unit 104 then outputs the calculated value to the control unit 34 as the photometric value P. The control unit 34 may obtain the photometric value using a different photometric weight to weight each divisional image region based on an instruction to start backlight correction provided from the instruction unit.

The photometry unit 104 extracts the luminance level of the image based on image data that is yet to be subjected to digital processing, which will be described later. In this case, the photometric value P (signal value), which is output from the photometry unit 104, indicates the luminance level of the image itself. The photometry unit 104 is only required to detect the luminance level (received light amount) of the image captured by the imaging apparatus 100. Thus, the photometry unit 104 may use the signal A or the signal B shown in FIG. 1 to obtain the photometric value P.

The first signal processing unit 102A receives image data (digital image data) output from the analogue signal processing unit 2. The first signal processing unit 102A subjects the input image data to pre-processing, such as noise removal. The first signal processing unit 102A then outputs the resulting image data (digital image signal) to the local backlight correction unit 101 and the interior-division processing unit 103. The pre-processing performed by the first signal processing unit 102A includes white balance correction, pixel interpolation, color correction, noise reduction, enhancement, and gamma correction. The first signal processing unit 102A subjects the image data to the processing as necessary.

Pixel interpolation is the process of interpolating missing color information of each pixel using neighboring pixels. An image signal (image data) corresponding to each pixel obtained by the image sensor of the imaging unit 13, in which red, green, and blue (R, G, and B) color filters are formed separately, contains information about only one of the R, G, and B colors (contains information about only the same color as the color filter of the pixel). Information about the remaining two colors that are not contained in the signal is estimated by interpolation using neighboring pixels of the missing colors. The missing color information of the pixel is then interpolated using the estimated information. When, for example, image data corresponds to a pixel on which the R color filter is arranged, the image data is used directly as the R element image data of the pixel. Image data of the G and B elements of the pixel is interpolated using neighboring pixels on which the G and B color filters are arranged. The image data of the G and B elements of the pixel is obtained in this manner. Such pixel interpolation enables image signals (image data) having R, G, and B color information to be obtained.

Color correction is the process of converting RGB values that are determined by the properties of the color filters, which are used in the image sensor of the imaging unit 13, to RGB values defined in a standardized color space, such as a color space that complies with NTSC (National Television System Committee) or sRGB (standard RGB).

Noise reduction is the process of differentiating noise from signal elements based on the amplitude and frequency of image data (image signals) and reducing noise.

Enhancement is the process of increasing the resolution of an image by compensating for a decrease in the modulation transfer function (MTF), which may occur due to the lens diameter or an adjustment amount of the aperture 12 of the imaging lens 11.

The first signal processing unit 102A is not an essential component when the output value of a digital image signal (digital image data) output from the analogue signal processing unit 2 has a predetermined precision.

Although the photometric value P is a signal whose level changes linearly with respect to the light amount, the local backlight correction unit 101 nonlinearly processes a signal resulting from gamma correction. In this case, the local backlight correction unit 101 actually needs to consider the effect of gamma correction. However, the gamma correction is not an essential part of the present invention. For ease of understanding, the signal processing will be described as linear processing in this specification.

The local backlight correction unit 101 performs the local backlight correction described above. The local backlight correction unit 101 receives image data output from the first signal processing unit 102A (or the analogue signal processing unit 2 when the first signal processing unit 102A is eliminated), and subjects the input image data to the local backlight correction. The local backlight correction unit 101 then outputs the resulting image data to the interior-division processing unit 103. The local backlight correction unit 101 obtains a value indicating a rough luminance level of an image region of an image that is formed using image data (for example, an average value of pixels included in the image region). The image region includes a processing target pixel (target pixel) and has a predetermined size (which can indicate a rough luminance level). The local backlight correction unit 101 then subjects image data corresponding to the processing target pixel (target pixel) to the backlight correction (dark region correction) based on the obtained value. The processing performed by the local backlight correction unit will be described later.

The interior-division processing unit 103 receives the image data (unprocessed image) output from the first signal processing unit 102A (or the analogue signal processing unit 2 when the first signal processing unit 102A is eliminated) and the image data (processed image) that has been subjected to the local backlight correction and output from the local backlight correction unit 101. The interior-divisional processing unit 103 then subjects the unprocessed image data and the processed image data to interior-division (subjects the pixel values to interior-division, or subjects the values of pixels at the same coordinate positions on the two images formed using the unprocessed image data and the processed image data to interior-division) based on an effect adjustment signal provided from the control unit 34 (with a value (real value) in a range of 0.0 to 1.0). The interior-division processing unit 103 then outputs the image data resulting from the interior-division to the second signal processing unit 102B. The image data (unprocessed image) output from the first signal processing unit 102A (or the analogue signal processing unit 2 when the first signal processing unit 102A is eliminated) is assumed to be image data InA. The image data (processed image) subjected to the local backlight correction and output from the local backlight correction unit 101 is assumed to be image data InB. The image data output from the interior-division processing unit 103 is assumed to be image data Out. The effect adjustment signal is assumed to have a value H. In this case, the interior-division processing unit 103 calculates the image data Out using the formula:

$$Out = InA + H^*(InB - InA),$$

and outputs the image data Out to the second signal processing unit 102B.

When, for example, the effect adjustment signal H with a value of 0.0 is input, the interior-division processing unit 103 outputs the unprocessed image (image data that is yet to be subjected to the backlight correction). When, for example, the effect adjustment signal H with a value of 1.0 is input, the interior-division processing unit 103 outputs the image data that has been subjected to the local backlight correction.

The second signal processing unit (second signal processing circuit) 102B receives image data output from the interior-division processing unit 103, and subjects the input image data to post-processing (including color adjustment).

Figure 3:
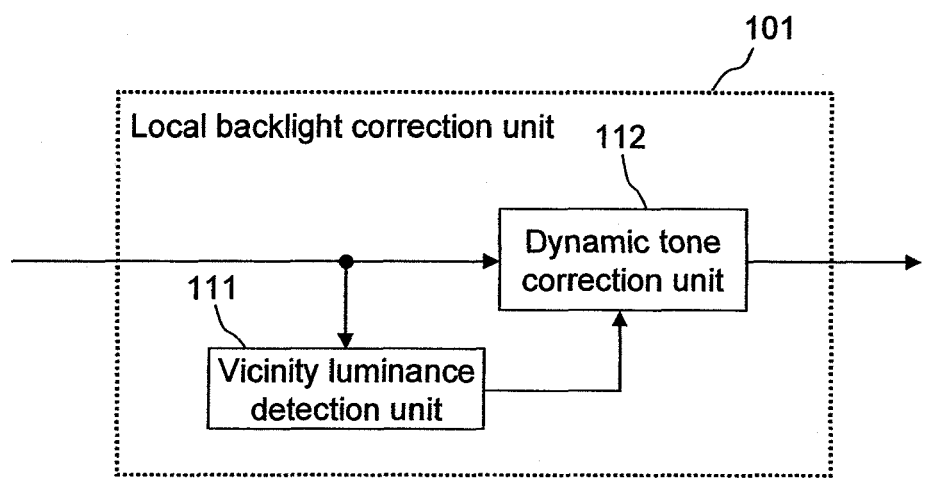
FIG. 3 is a block diagram of a local backlight correction unit 101 according to the first embodiment.
Figure 4:
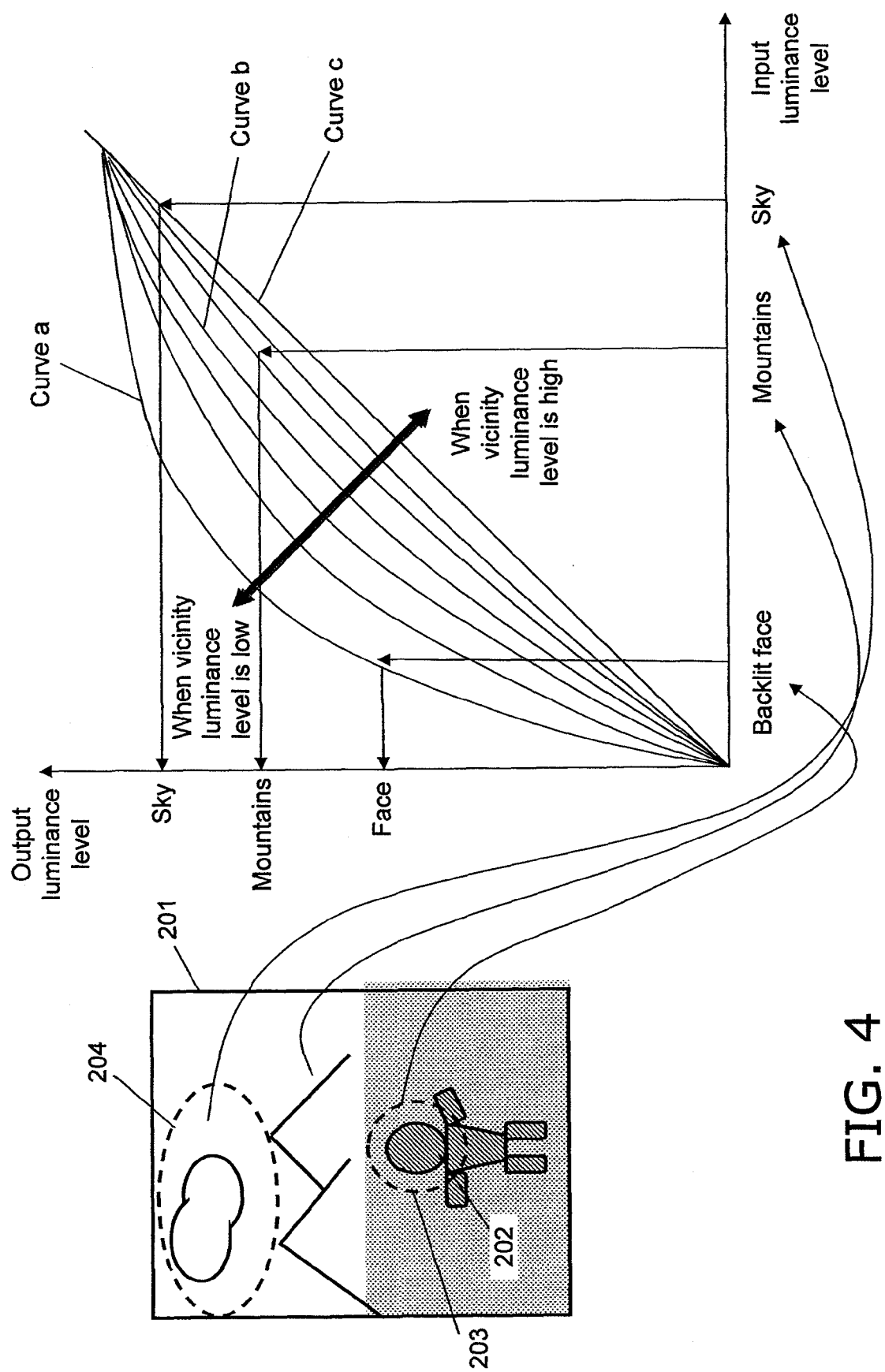
FIG. 4 is a diagram describing tone conversion characteristics used in the local backlight correction unit 101.

FIG. 3 shows the structure of the local backlight correction unit 101. FIG. 4 shows the input-output conversion characteristics of the local backlight correction unit 101.

The local backlight correction unit 101 includes a vicinity luminance detection unit 111 and a dynamic tone correction unit 112.

The vicinity luminance detection unit 111 detects a representative value (for example, an average value or a weighted average value) representing values of a plurality of pixels in the vicinity of a processing target pixel (target pixel).

The dynamic tone correction unit 112 uses one of the tone curves (tone conversion characteristic curves) shown in FIG. 4 according to an output of the vicinity luminance detection unit 111. The output of the vicinity luminance detection unit 111 changes depending on the position of the processing target pixel in the image. Accordingly, the output of the vicinity luminance detection unit 111 changes depending on the position of the processing target pixel in the image. As shown in FIG. 4, the input-output conversion characteristic (tone conversion characteristic) that is selected by the dynamic tone correction unit 112 also changes depending on the position of the processing target pixel in the image.

FIG. 4 shows seven tone curves (tone conversion characteristic curves) that are selectively used according to the luminance level of the region surrounding the processing target pixel (target pixel). The curve a is selected when the luminance level of the region surrounding the target pixel is the darkest, the curve c is selected when the luminance level of the region surrounding the target pixel is the brightest, and the curve b is selected when the region surrounding the target pixel has an intermediate luminance level between the darkest and the brightest cases. Although FIG. 4 shows the seven tone conversion characteristic curves for ease of explanation, the number of the characteristic curves should not be limited to seven. It is preferable that the tone conversion characteristic curves are as many as possible within the range in which the conversion characteristic curves can be calculated with a permissible calculation precision. It is preferable that the tone conversion characteristic curves are as many as curves that can be assumed to change continuously as the luminance level of the region surrounding the target pixel changes. Also, several tone conversion characteristic curves representing typical tone conversion characteristics may be prepared, and tone conversion characteristics representing characteristics between the typical tone conversion characteristics may be calculated based on the prepared tone conversion characteristic curves.

When the input luminance level is in a range of 0.0 to 1.0, the tone curves (tone conversion characteristic curves) may be calculated in a manner that the value of the gamma coefficient (for example, 0.4 to 2.0, which means $0.4 \leq \gamma \leq 2.0$) becomes smaller as the luminance level of the region surrounding the target pixel becomes smaller. Alternatively, the data corresponding to the above tone conversion characteristic curves may be stored in advance in a lookup table (LUT). For example, a two-dimensional LUT may store output values that are determined using the above tone conversion characteristic curves when the pixel value of the target pixel (processing target pixel) and the value representing the luminance level of the region surrounding the target pixel (for example, the average value of pixel values of the vicinity pixels included in the region surrounding the target pixel) are input.

The tone conversion characteristic curve a is selected when the region surrounding the processing target pixel is dark (for example, the curve a is selected for an image region 203 in FIG. 4). After the tone conversion performed using the curve a, the face region 203, which is a backlit dark region, has an appropriately high luminance level.

The tone conversion characteristic curve c is selected when the region surrounding the processing target pixel is extremely bright (for example, the curve c is selected for an image region 204 in FIG. 4). After the tone conversion performed using the curve c, the image region 204 has the same luminance level as in the image before the tone conversion. Through such tone conversion, the imaging apparatus obtains an image with a high definition that is seen natural.

This technique, called the visualization-characteristic-based technique, is based on the visual characteristics of the human eyes, which increase sensitivity when viewing a bright region. This technique enables even drastic backlight correction to be performed without causing the processed image to be unnatural.

The present invention should not be limited to the structure described above. In particular, the local backlight correction unit 101 may be formed using a technique of substantially changing the input and output conversion characteristics according to a spatial position of a processing target pixel in an image. For example, the structure of the local backlight correction unit 101 may be modified to use other techniques known in the art, such as the technique described in the patent citations described above, a Retinex-theory-based technique, and local histogram equalization, with which the local backlight correction unit 101 can have substantially the same advantageous effects as described above.

The vicinity luminance detection unit 111 uses a region (the region consisting of pixels that are in the vicinity of a processing target pixel) whose size is set according to a required effect. To achieve the visualization effect, it is preferable that the region surrounding the processing target pixel has a sufficiently large size. For example, when the processing target image is an XGA (extended Graphics Array) image (1024 by 768 pixels), it is preferable to set the region (the region consisting of pixels that are in the vicinity of a processing target pixel) having at least an area corresponding to 80 by 80 pixels. The vicinity luminance detection unit 111 may use a low-pass filter to obtain information about the luminance level of a region surrounding a target pixel (processing target pixel), such as an FIR (finite impulse response) low-pass filter, which is normally used to generate unsharp signals.

1.2 Operation of the Imaging Apparatus

The operation of the imaging apparatus with the above-described structure will now be described.

The operation of the imaging apparatus 100 of the present embodiment will be described focusing on the processing performed by the control unit 34.

When receiving an instruction (interrupt) to instruct backlight correction from a user (when a control signal (instruction signal U) instructing to perform backlight correction is input into the control unit 34 from the input unit 7), the control unit 34 performs the processing described below and executes control and settings required in the imaging apparatus 100.

(1) The control unit 34 outputs an aperture adjustment signal for controlling the exposure light amount and an electric gain adjustment signal to the optical system of the imaging apparatus 100.

(2) The control unit 34 also outputs the effect adjustment signal etc. described above to the signal processing unit 31 substantially simultaneously with when outputting the aperture adjustment signal and the electric gain adjustment signal.

More specifically, the control unit 34 outputs the aperture adjustment signal to the aperture 12 of the imaging apparatus 100 to decrease the received light amount of the imaging unit 13 substantially simultaneously with when enabling the local backlight correction to increase the luminance level of a dark region of the captured image. Based on the aperture adjustment signal, the imaging apparatus 100 starts its operation of decreasing the aperture. In other words, when instructed to start the backlight correction, the control unit 34 starts the operation of decreasing the aperture 12 to decrease the luminance level of the dark region of the captured image further, and at the same time starts the operation of increasing the luminance level of the dark region of the captured image through the local backlight correction.

Figure 6:
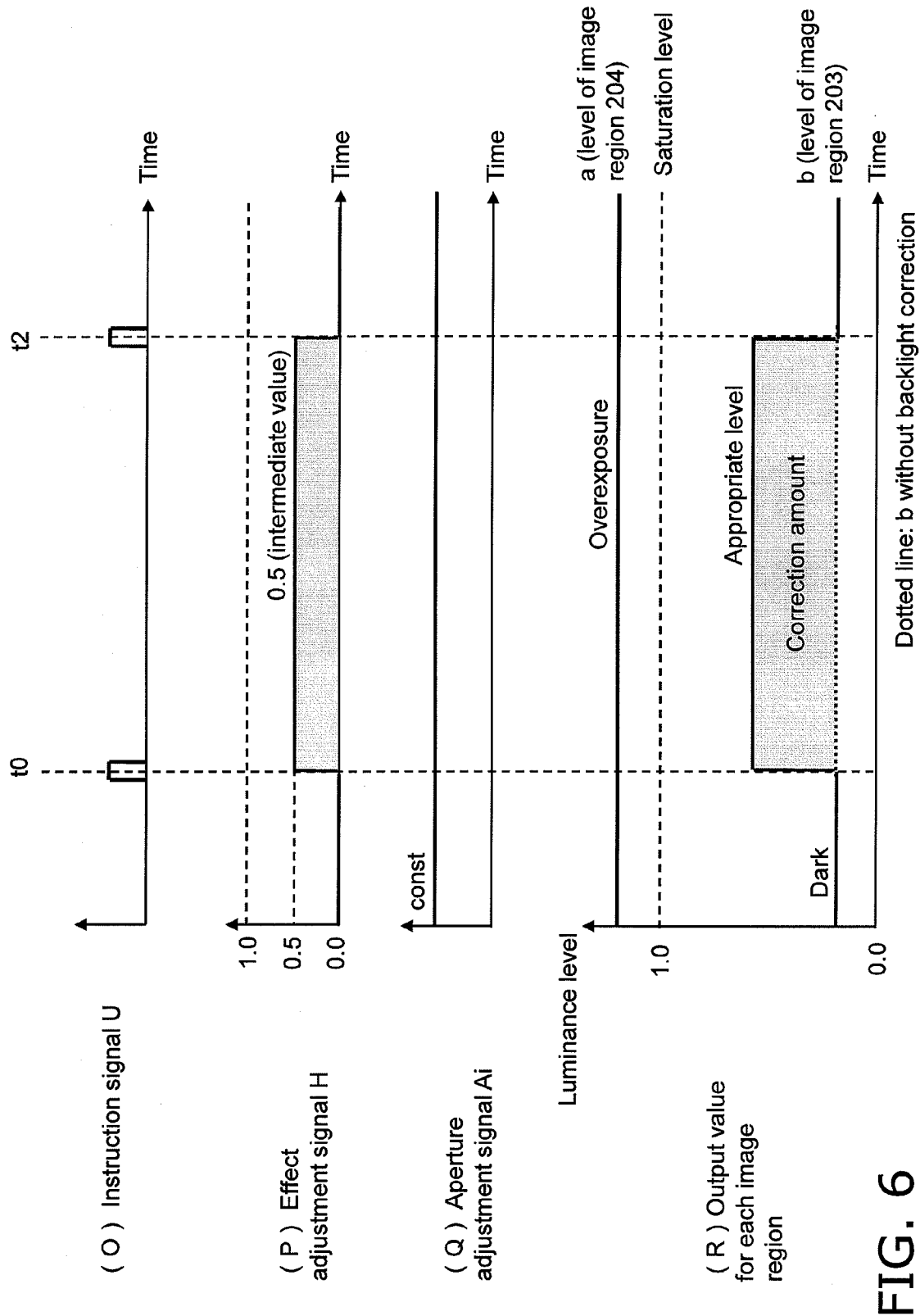
FIGS. 6O to 6R are timing charts showing the operation timings of processing performed with a conventional technique.
Figure 7:
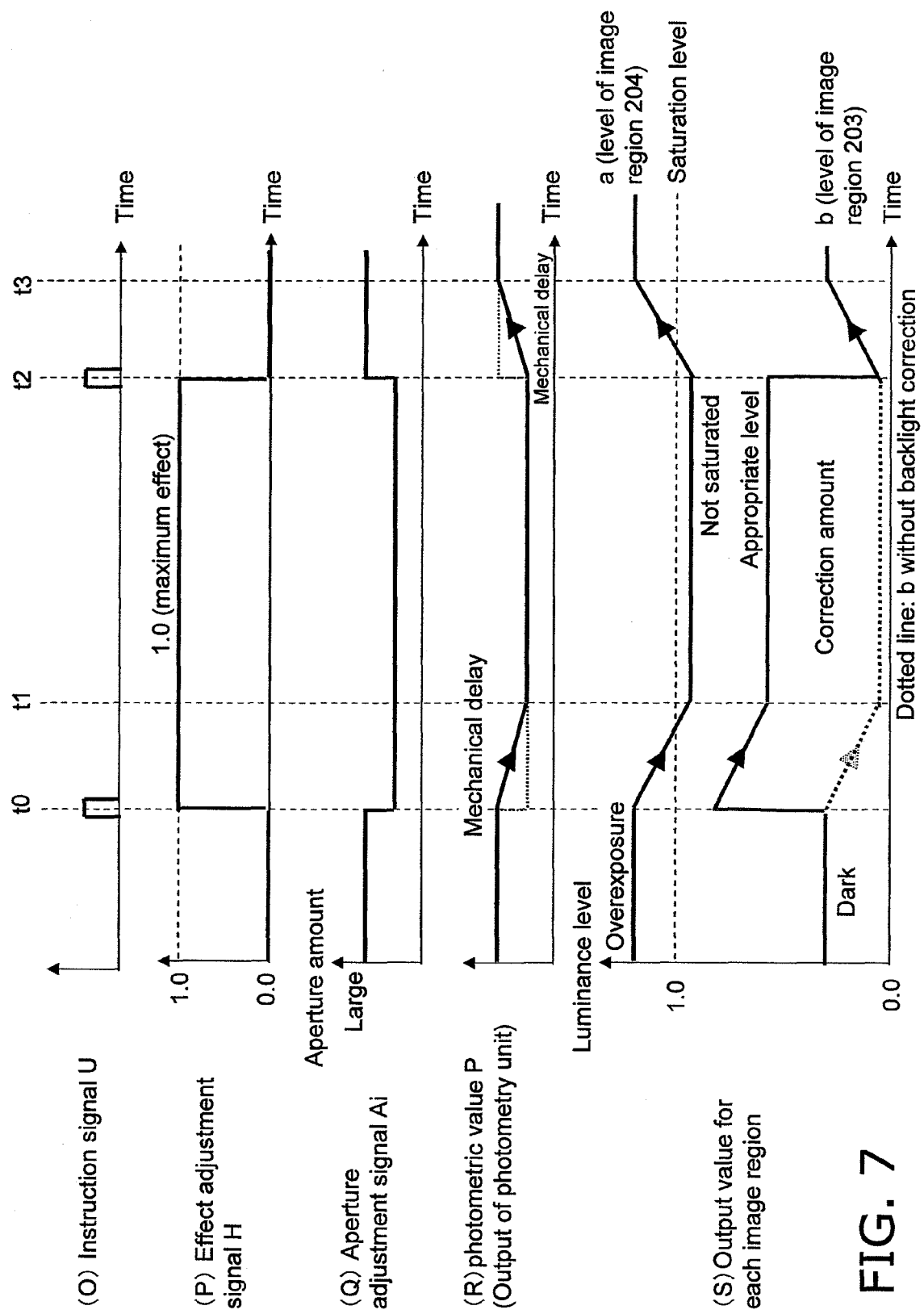
FIGS. 7O to 7S are timing charts showing the operation timings of processing performed with a first technique according to the first embodiment.
Figure 8:
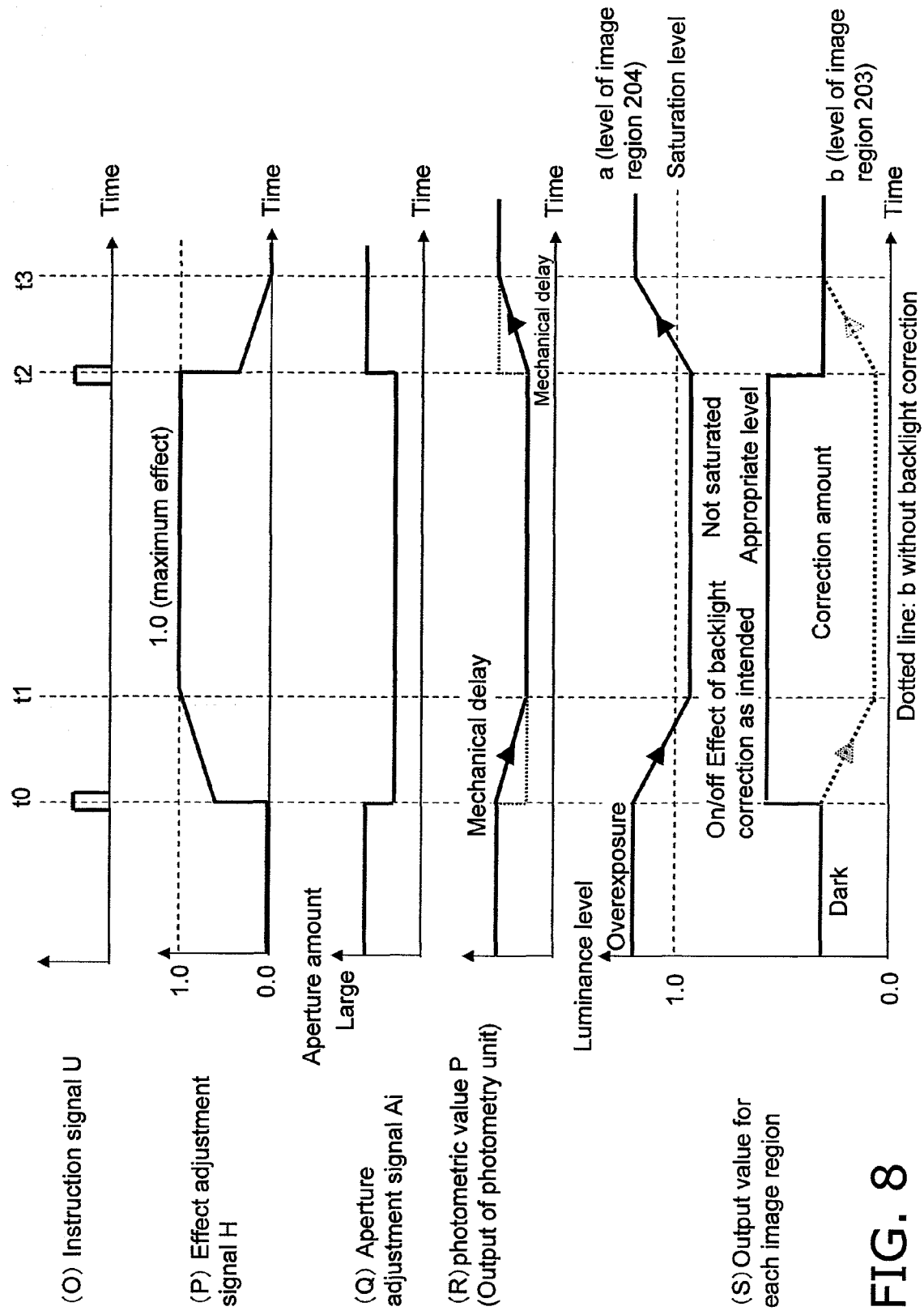
FIGS. 8O to 8S are timing charts showing the operation timings of processing performed with a second technique according to the first embodiment.
Figure 9:
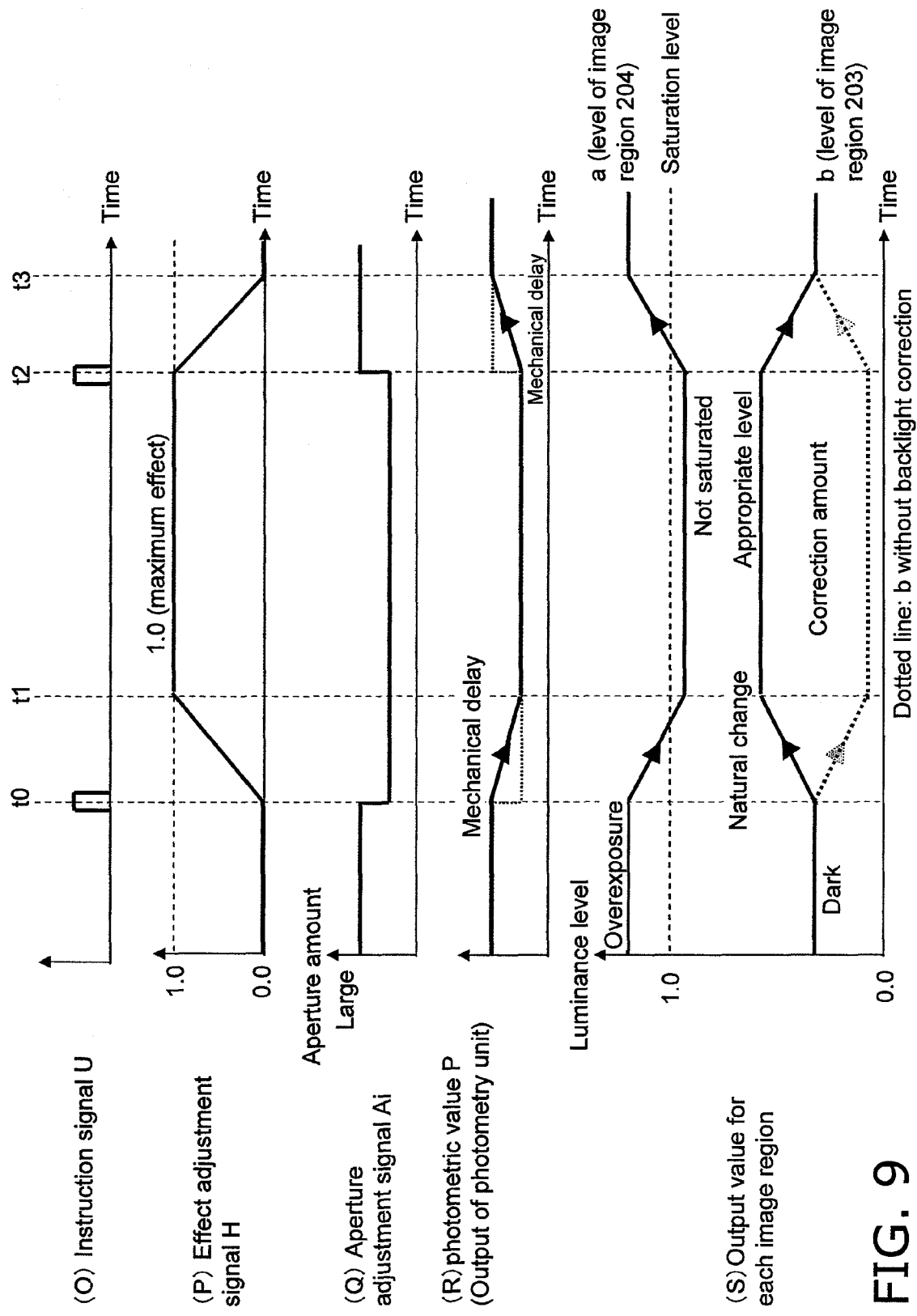
FIGS. 9O to 9S are timing charts showing the operation timings of processing performed with a third technique according to the first embodiment.

The exposure control of the video camera for capturing a moving image (imaging apparatus 100) according to the present embodiment and the operation of the control unit associated with the local backlight correction will now be described in comparison with these controls executed with a conventional technique. More specifically, the exposure control and the local backlight correction control executed when an image of a scene shown in FIG. 5 is captured will now be described with reference to FIG. 6 (conventional technique), FIG. 7 (first technique of the present invention), FIG. 8 (second technique of the present invention), and FIG. 9 (third technique of the present invention).

Figure 5:
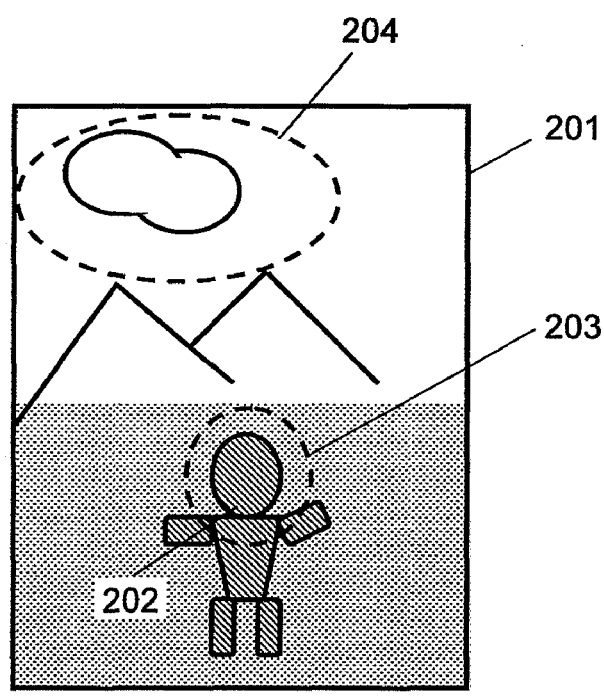
FIG. 5 shows an example of a scene.

FIG. 5 schematically shows one example of a scene.

The entire scene 201 shown in FIG. 5 is subjected to backlight correction. The scene 201 includes a person's face 202, which is a main subject, in the foreground and a bright blue sky, clouds, and mountains in the background. Image characteristic amount extraction units detect the image regions 202 to 204. The image region 202 is a main subject (face) region. The image region 203 is a main subject vicinity region. The image region 204 is a brightest region (highlight region) (sky and clouds).

The control executed when the scene 201 is shown in FIG. 5 is processed using the conventional technique and the techniques of the present invention will now be described.

1.2.1 Conventional Technique

FIGS. 6O to 6Q show the operation (operation timings) of the imaging apparatus 100 when the imaging apparatus 100 captures an image of the scene using the conventional technique.

FIG. 6O shows the waveform of an instruction signal U input from the input unit 7 to the control unit 34. FIG. 6P shows the waveform of an effect adjustment signal H output from the control unit 34 to the interior-division processing unit 103 included in the signal processing unit 31. FIG. 6Q shows the waveform of an aperture adjustment signal Ai output from the control unit 34 to the aperture 12. FIG. 6R is a graph showing the output value (luminance value) for each image region processed using the conventional technique. In FIGS. 6O to 6R, the horizontal axis indicates time. The time axes in FIGS. 6O to 6R are identical to one another.

As shown in FIGS. 6O to 6R, the control unit of the imaging apparatus detects a change in the state of the backlight correction mode (from off to on) instructed by the user at timing t0 (see FIG. 6O). Upon detecting the change, the control unit outputs an effect adjustment signal with a value of 0.5 (an intermediate value (or an average value) between the value of a corrected image data output signal subjected to backlight correction and an uncorrected image signal) (see FIG. 6P).

The processing according to the conventional technique shown in FIGS. 6O to 6R is performed independently of the aperture. Thus, the aperture control value (aperture adjustment signal Ai) remains constant (see FIG. 6Q).

FIG. 6R shows an output image obtained with the conventional technique (a conventional output image obtained through the processing in which the aperture adjustment signal is provided independently of the operation of the image processing unit). In FIG. 6R, the signal level a indicates the output luminance value of the image region 204 (brightest region or highlight region (sky and clouds)) of the scene 201 shown in FIG. 4. In FIG. 6R, the signal level b indicates the output luminance value of the image region 202 (main subject (face)) of the scene 201. A dotted line in FIG. 6R indicates the maximum luminance level that can be processed by the image sensor of the imaging unit 13 (the level at which the signal A in FIG. 1 is saturated (saturation level)) (1.0 in FIG. 6R).

As the signal level b in FIG. 6R (the level (output luminance value) of the image region 203) indicates, the face region of the captured image is subjected to the local backlight correction with a lower effect (with an effect of about 0.5). The effect of the local backlight correction correlates with the value of the effect adjustment signal. Through such moderate local backlight correction, the slightly dark face region is processed to have an appropriately high luminance level. However, the local backlight correction alone cannot change the luminance level of the sky region (region 204), which has a luminance level originally exceeding the saturation level. As a result, the sky region of the image processed using the conventional technique remains to be overexposed and fail to reproduce color (the sky region has lost tones), whereas the person region of the image processed using the conventional technique has a high luminance level. Also, such moderate backlight correction (with the effect of about 0.5 (effect of the backlight correction obtained based on the effect adjustment signal with a value of about 0.5) is possible using even the conventional tone curves (tone conversion characteristic curves) (backlight correction using tone conversion performed using the tone conversion curves shown in FIG. 2 of Non-patent citation 1), although a certain level of unnaturalness of the resulting image needs to be permitted.

1.2.2 First Technique

FIGS. 7O to 7S are timing charts describing the operation of the imaging apparatus 100 (in particular the operation of the control unit 34) according to the present embodiment using the first technique of the present invention. FIG. 7O shows the waveform of an instruction signal U input from the input unit 7 to the control unit 34. FIG. 7P shows the waveform of an effect adjustment signal H output from the control unit 34 to the interior-division processing unit 103 included in the signal processing unit 31. FIG. 7Q shows the waveform of an aperture adjustment signal Ai output from the control unit 34 to the aperture 12. FIG. 7R shows the waveform of a signal indicating the photometric value P output from the photometry unit 104 to the control unit 34. FIG. 7S is a graph showing the output value (luminance value) of each image region after the processing is performed using the first technique of the present invention. In FIGS. 7O to 7S, the horizontal axis indicates time. The time axes in FIGS. 7O to 7S are identical to one another.

As the timing charts of FIGS. 7O to 7S show, the processing performed using the first technique differs from the processing performed using the conventional technique shown in the timing charts of FIGS. 6O to 6R in that the control unit 34 executes the image processing and the aperture control in an interrelated manner (the control unit 34 starts the local backlight correction and the operation of closing the aperture 12 at a timing instructed by the user).

The timings at which the control unit 34 detects a change in the instruction signal U, the control unit 34 changes the effect adjustment signal, and the control unit 34 changes the aperture adjustment signal may slightly vary depending on clock signals. However, such variations will not be described in detail.

The control unit 34 first detects a change in an instruction signal (instruction signal U shown in FIG. 7O) (turning on of the backlight correction mode) at timing t0. Upon detecting the change in the instruction signal U, the control unit 34 outputs an effect adjustment signal with its maximum value of 1.0 (the effect adjustment signal H shown in FIG. 7P) to the interior-division processing unit 103 included in the signal processing unit 31. As described later, the control unit 34 controls the optical system of the imaging apparatus 100 to decrease the aperture 12 substantially simultaneously with when turning on the correction function (local backlight correction function) of the signal processing unit 31. When the aperture 12 is decreased, the luminance level of the backlit person image region is darkened further. The control unit 34 then sets the effect adjustment signal with its maximum value to maximize the effect of the local backlight correction and increase the luminance level of the backlit person image region. In other words, the imaging apparatus 100 decreases the luminance level of the image region (for example, the backlit person image region) by decreasing the aperture 12 and at the same time increases the luminance level of the image region through the local backlight correction. Through such processing, the imaging apparatus 100 obtains an image with an appropriate luminance level.

Also, the control unit 34 outputs the effect adjustment signal (aperture adjustment signal Ai shown in FIG. 7Q) to the aperture 12 of the optical system included in the imaging apparatus 100 at substantially the same timing as timing t0, at which the effect adjustment signal is set at the maximum value of 1.0.

The control unit 34 gradually decreases the received light amount of the imaging unit 13 by decreasing the aperture 12 through mechanical control until the aperture value (aperture amount) reaches the value corresponding to the value of the aperture adjustment signal. Accordingly, the output value (photometric value P shown in FIG. 7S) of the photometry unit 104 also decreases gradually.

FIG. 7S shows the luminance level of each image region of an output image obtained by the imaging apparatus 100 using the first technique. With the processing performed using the first technique, the aperture 12 is decreased to prevent an image signal (image signal output from the imaging unit 13) corresponding to the sky region 204 generated by the image sensor of the imaging unit 13 from being saturated. Also, the image correction (local backlight correction) is performed using the effect adjustment signal to decrease the luminance value (level) a of the sky region 204 (to the level of the image signal at which the image would not be overexposed and fail to reproduce color (to the image signal level lower than or equal to the saturation level) in a manner interrelated with the operation of decreasing the aperture 12. As a result, the sky region 204 of the image processed using the first technique has an appropriate luminance level (see the level a (level of the image region 204) shown in FIG. 7S).

Through the processing performed using the first technique, the operation of decreasing the aperture 12 enables the image data (image signal) corresponding to the sky region 204 to be converted to image data (image signal) with an appropriate luminance level without being overexposed and failing to reproduce color. Further, the image data (image signal) corresponding to the face region 203 is subjected to the local backlight correction with a high effect. As a result, the image data corresponding to the face region 203 is also converted to image data (image signal) with an appropriate luminance level. With the first technique, the imaging apparatus 100 obtains the image in which both the sky region 204 and the face region 203 have appropriate luminance levels.

As described above, the first technique enables the exposure light amount of the imaging apparatus 100 to be set in a manner to prevent the overexposure of the sky region 204, and prevents the highlight region of the image from being saturated in the image sensor of the imaging unit 13. The person region 203, which is extremely darkened complementarily (darkened by adjusting the exposure light amount) may further be subjected to strong local backlight correction to obtain a visually natural image. In this manner, the first technique enables the luminance level of the person (luminance level of the person region) to be increased to a desired luminance level.

1.2.3 Second Technique

The operation of the imaging apparatus 100 (in particular the operation of the control unit 34) performed using the second technique of the present invention will now be described with reference to FIGS. 8O to 8S.

FIGS. 8O to 8S are timing charts describing the operation of the imaging apparatus 100 (in particular the operation of the control unit 34) according to the present embodiment performed using the second technique. FIG. 8O shows the waveform of an instruction signal U input from the input unit 7 to the control unit 34. FIG. 8P shows the waveform of an effect adjustment signal H output from the control unit 34 to the interior-division processing unit 103 included in the signal processing unit 31. FIG. 8Q shows the waveform of an aperture adjustment signal Ai output from the control unit 34 to the aperture 12. FIG. 8R shows the waveform of a signal indicating the photometric value P output from the photometry unit 104 to the control unit 34. FIG. 8S is a graph showing the output value (luminance value) for each image region after the processing is performed using the second technique of the present invention. In FIGS. 8O to 8S, the horizontal axis indicates time. The time axes in FIGS. 8O to 8S are identical to one another.

With the processing performed using the first technique described above shown in FIG. 7S, mechanical delay occurs before the setting of the aperture 12 is actually reflected in the received light amount (see FIG. 7R) (the time (t1–t0) is required before the change in the signal value of the aperture adjustment signal Ai at timing t0 is reflected completely in the photometric value P). Due to such mechanical delay, the luminance level a of the sky region starts decreasing at timing t0 and decreases gradually. In other words, the overexposure of the sky region starts being eliminated at timing t0. In contrast, the luminance level b of the face region once increases excessively between timings t0 to t1, and then decreases gradually to an appropriate luminance level and is maintained at the appropriate luminance level. In this manner, the face region shows unnatural changes in its luminance level (problem 1).

Also, when the imaging apparatus 100 is actually operated using the first technique, the inventors of the present invention have found not only that the luminance level b of the face region appears unnatural, but also that humans are less likely to perceive the final value of the graph b (luminance level b of the image region 203 at timings t1 to t2 in FIG. 7S) as a value greater than the value at or before timing t0 (less likely to perceive that the face has been brightened). In other words, humans are less likely to perceive the effect of the backlight correction performed with the first technique (problem 2).

Also, the luminance level b of the face region changes unnaturally between timings t2 to t3, during which the backlight correction by the signal processing unit 31 is off. More specifically, the luminance level b of the face region changes unnaturally between timing t2 to t3. The luminance level b of the face region first decreases to the level lower than the luminance level of the original backlit image, and then returns to the original luminance level (problem 3).

The second technique of the present invention intends to solve the problems 1 to 3 described above.

With the second technique, as shown in FIGS. 8O to 8S, the control unit 34 instantaneously increases the level of the effect adjustment signal H, which is used to perform the local backlight correction, to a predetermined level at timing t0, and then increases the level of the effect adjustment signal H gradually toward a maximum value between timings to to t1 (see FIG. 8P). This technique enables the luminance level b of the face region to be maintained as an appropriate output luminance level (see FIG. 8P).

The changes in the level of the effect adjustment signal H as a function of time shown in FIG. 8P are substantially identical to the actual changes in the aperture 12 decreased mechanically with time (see FIG. 8R).

As shown in FIG. 8P, the value of the effect adjustment signal is contradictory to (or cancels) the photometric value (measurement value P) shown in FIG. 8R.

More specifically, the control unit 34 outputs the aperture adjustment signal Ai shown in FIG. 8Q to the aperture 12, and also outputs the effect adjustment signal H shown in FIG. 8P to the interior-division processing unit 103 included in the signal processing unit 31.

FIG. 8S shows the luminance level of each image region of an output image that is formed using the second technique.

The luminance level b of the face region is maintained as an appropriate output luminance level after the backlight correction function of the user is turned on (see the signal level b in FIG. 8S), independently of the aperture amount of the aperture 12 (changes in the actual received light amount of the imaging unit 13 (affected by mechanical delay)). As a result, the second technique solves the problem 1 described above.

The drastic backlight correction described above, which increases the luminance level of the face region of the backlit image whose luminance level has once been decreased further by decreasing the aperture, is impossible with the processing performed simply using the conventional tone curves (tone conversion characteristic curves). Such drastic backlight correction is only possible (or only practically possible) through the backlight correction (local backlight correction) of the present invention using the local tone correction performed in a manner interrelated with the light amount adjustment function.

1.2.4 Third Technique

The operation of the imaging apparatus 100 (in particular the operation of the control unit 34) performed using the third technique of the present invention will now be described with reference to FIGS. 9O to 9S.

FIGS. 9O to 9S are timing charts describing the operation of the imaging apparatus 100 (in particular the operation of the control unit 34) according to the present embodiment performed using the third technique. FIG. 9O shows the waveform of an instruction signal U input from the input unit 7 to the control unit 34. FIG. 9P shows the waveform of an effect adjustment signal H output from the control unit 34 to the interior-division processing unit 103 included in the signal processing unit 31. FIG. 9Q shows the waveform of an aperture adjustment signal Ai output from the control unit 34 to the aperture 12. FIG. 9R shows the waveform of a signal indicating the photometric value P output from the photometry unit 104 to the control unit 34. FIG. 9S is a graph showing the output value (luminance value) for each image region after the processing is performed using the third technique of the present invention. In FIGS. 9O to 9S, the horizontal axis indicates time. The time axes in FIGS. 9O to 9S are identical to one another.

The processing performed using the second technique described above (see FIGS. 8O to 8S) eliminates the effect of mechanical delay occurring before the setting of the aperture 12 of the optical system included in the imaging apparatus 100 is reflected. The output image obtained through this processing has an appropriate luminance level. However, as described above, humans may feel strange when viewing an image whose luminance level does not change gradually after the backlight correction function of the imaging apparatus 100 is turned on (problem 2).

The processing performed using the third technique (see FIGS. 9O to 9S) enables the value of the effect adjustment signal H to be changed in a continuous manner (between timings t0 and t1 in FIG. 9Q).

Although not described in detail, the effect adjustment signal H shown in FIGS. 8P and 9P may change nonlinearly when, for example, the backlight correction unit is formed to output the gain used to process an input signal or when the backlight correction unit considers the difference between linear control and gamma control.

The value of the effect adjustment signal is changed in the manner shown in FIG. 9P. In this case, at or after timing t0, the luminance level of the face image region increases gradually and finally reaches an appropriate luminance level in the backlight correction (at timing t1 in FIG. 9P) and is maintained at the appropriate luminance level. The intensity of the local backlight correction (the effect of the effect adjustment signal H) finally becomes the intensity of the backlight correction shown in FIGS. 6P to 8P.

Also, as shown in FIG. 9P, with the processing performed using the third technique, the luminance level a of the sky region 204 decreases and the luminance level b of the face region 203 increases in an interrelated manner at and after timing t0 (the luminance level of the image region of the processed image actually changes between t0 and t1). In this case, the effect of the backlight correction (changes in the luminance level of the predetermined image regions) in the processed image of the imaging apparatus 100 appears to be natural, and also is easily perceived (recognized) by the user.

As shown in FIGS. 9O to 9S, the luminance level of the face region 203 decreases gradually even after timing t2 (at which the aperture adjustment signal Ai is changed in response to the instruction signal U for turning off the backlight correction), at which the backlight correction is stopped. The luminance level of the face region 203 then automatically returns to its original luminance level. Thus, the imaging apparatus 100 shows natural and smooth changes in the luminance level of the image in response to both the on and off instructions of the backlight correction provided by the user. In this case, the user can freely turn on and off the backlight correction without limitation while the imaging apparatus 100 is capturing a moving image. The imaging apparatus 100 therefore provides the functions that are extremely easy to use (the backlight correction function and the on/off switch function of the backlight correction).

As described above, with the first technique (see FIGS. 7O to 7S) of the present invention, the imaging apparatus 100 turns on the local backlight correction for increasing the luminance level of a dark region of a captured image in response to an instruction provided through the user I/F, and controls the optical system to decrease the received light amount of the imaging unit 13 (to turn on the operation of decreasing the aperture 12) substantially simultaneously with when turning on the local backlight correction.

With the first technique, the imaging apparatus 100 first sets the exposure light amount in a manner to prevent the sky region (highlight image region) from being overexposed and failing to reproduce color. This prevents the highlight region from being saturated in the image sensor of the imaging unit 13. Also, the imaging apparatus 100 subjects a person region (image region) whose luminance level has been decreased extremely due to the exposure control to stronger backlight correction through the visually natural local backlight correction. This increases the luminance level of the person region to an appropriate level of luminance.

With the second technique (see FIGS. 8O to 8S) of the present invention, the control unit 34 changes the correction amount (the effect of the local backlight correction) of the local backlight correction continuously according to the rate of change of the exposure light amount of the optical system included in the imaging apparatus 100.

With the second technique, the imaging apparatus 100 changes the effect of the local backlight correction using the effect adjustment signal in a manner to correspond to the amount of light, which decreases in stages with time due to mechanical delay occurring in the aperture control operation of the aperture 12 (to reflect gradual changes in the light amount due to mechanical delay). More specifically, the imaging apparatus 100 changes the effect of the local backlight correction (degree by which the luminance level of the dark region is increased) in a manner to compensate for (or cancel) the changes in the luminance level of the captured image, which occur when the light amount is changed (or the aperture 12 is decreased), during the time corresponding to the time in which the light amount changes actually. As a result, the imaging apparatus 100 obtains an image (processed image) in which all image regions (including a highlight image region and a backlit person image region) have appropriate luminance levels.

With the third technique of the present invention (see FIGS. 9O to 9S), for example, the luminance level of a sky region (highlight image region) of an image processed by the imaging apparatus 100 decreases gradually without overexposure, and the luminance level of a person region (image region) increases gradually. In this manner, the imaging apparatus 100 with the third technique has the effect of the local backlight correction in a natural manner.

First Modification

A first modification of the present embodiment will now be described.

Figure 10:
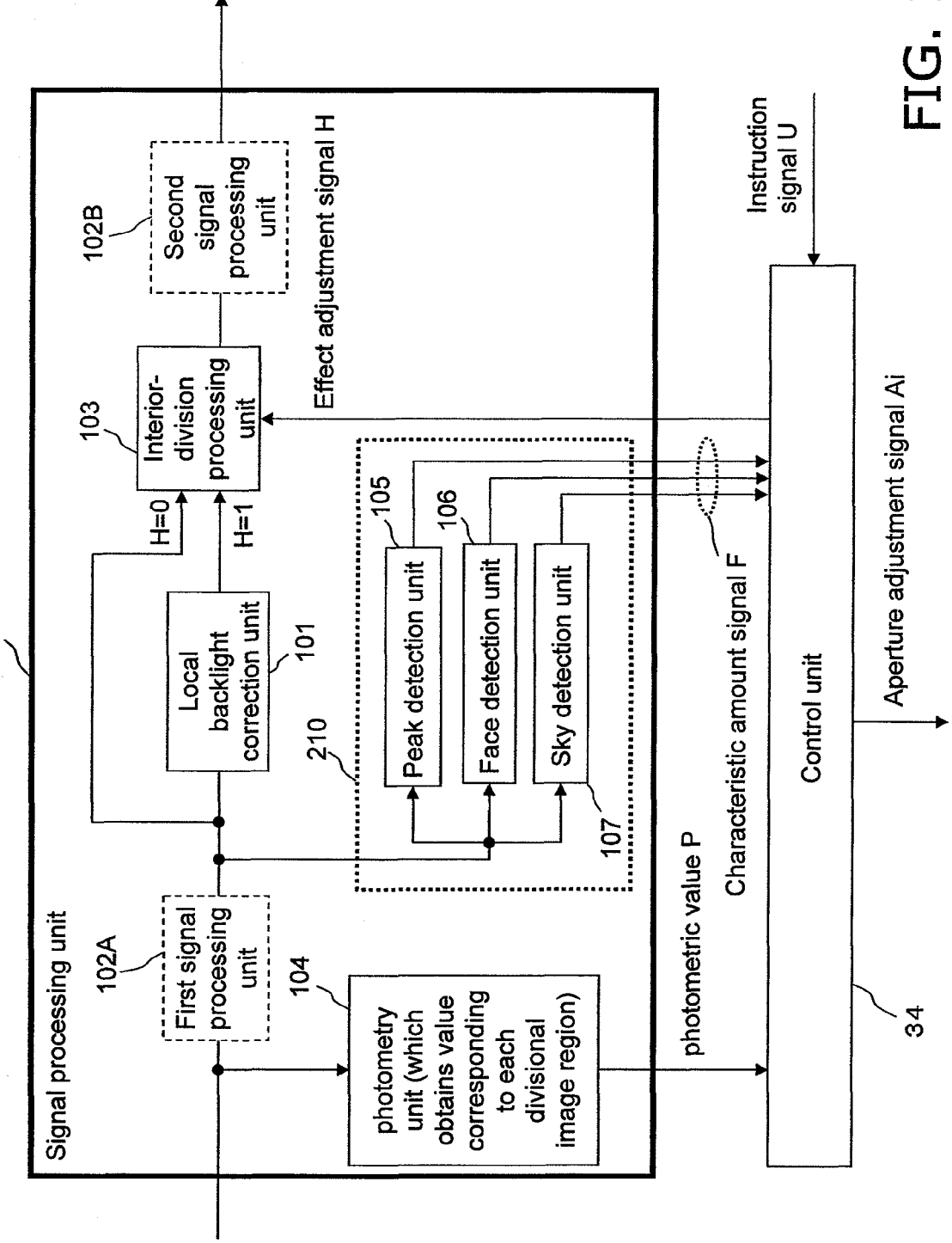
FIG. 10 is a block diagram of a signal processing unit 31A and a control unit 34 according to a first modification of the first embodiment.

FIG. 10 shows a signal processing unit 31A according to the first modification.

The signal processing unit 31A of the present modification differs from the signal processing unit 31 (see FIG. 2) of the first embodiment in that the signal processing unit 31A additionally includes an image characteristic amount extraction unit 210 and a photometry unit 104 of the signal processing unit 31A divides an image into a plurality of image regions and outputs a photometric value corresponding to each divisional image region. The other structure of the signal processing unit 31A is the same as the structure of the signal processing unit 31 of the first embodiment described above. Also, the imaging apparatus according to the first modification is the same as the imaging apparatus 100 of the first embodiment except that the signal processing unit 31 is replaced by the signal processing unit 31A. Thus, the imaging apparatus of the first modification will not be described in detail.

Figure 11A:
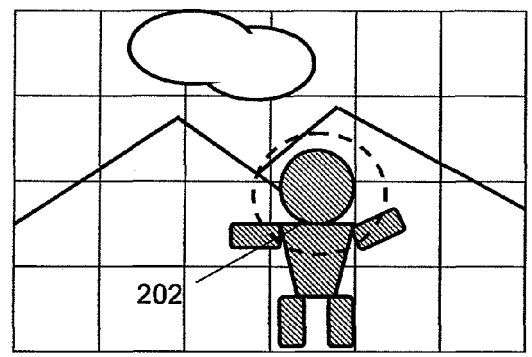
FIGS. 11A and 11B are schematic diagrams illustrating how a photometry unit 104 divides an image into a plurality of image regions each with a predetermined size and extracts a received light amount corresponding to each image region.

FIG. 11A is a schematic diagram illustrating how the photometry unit 104 divides an image into a plurality of image regions each with a predetermined size and extracts the received light amount corresponding to each divisional image region.

The image characteristic amount extraction unit 210 (a part indicated using a broken line in FIG. 10) receives image data (which may be image data stored in the storage unit (memory) 32) output from the first signal processing unit 102A (or the analogue signal processing unit 2 when the first signal processing unit 102A is eliminated). The image characteristic amount extraction unit 210 then extracts the characteristic amount from the input image data, and outputs a characteristic amount signal F to the control unit 34. The image characteristic amount extraction unit 210 includes at least one of a peak detection unit 105, a face detection unit 106, and a sky detection unit 107.

The peak detection unit 105 receives image data, and outputs, as an image characteristic amount, information about the position of a pixel with a highest luminance level (for example, the position of a pixel with the largest luminance value, the position of a pixel with the largest green-element value, etc.) (the position of an image region including such a pixel) in an image (image formed using the image data) and/or the luminance level of such a pixel (an image region including the pixel) in the image (for example, an average value or a weighted average value of values of pixels forming the image region).

Figure 11B:
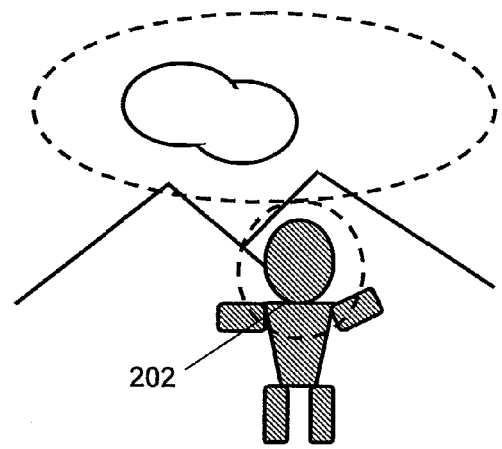

The face detection unit 106 receives image data, and determines whether an image formed using the image data includes a person's face using a face detecting algorithm known in the art. When determining that the image includes a person's face, the face detection unit 106 extracts the position and the size of the face and the luminance level of the face region (image region forming the face), and outputs the results to the control unit 34. In FIG. 11B, a lower circle drawn using a broken line indicates one example of an image region indicating a face detected by the face detection unit 106.

The sky detection unit 107 receives image data, and extracts pixels with color information of a predetermined blue element from an image formed using the input image data. The sky detection unit 107 then outputs information about the position, the size, and the luminance level of an image region indicating sky to the control unit 34. In FIG. 11B, an upper circle drawn using a broken line indicates one example of the image region indicating the sky detected by the face detection unit 106.

The first embodiment may further be modified in the following forms according to the first modification.

(1) The control unit 34 may control the photometry unit 104 to weight each divisional image region with a different weight (change the spatial weighting distribution) to obtain the received light amount based on an output (characteristic amount signal F) of the image characteristic amount extraction unit 210 when controlling the exposure light amount by decreasing the aperture 12 in a manner to prevent the sky region from being overexposed and failing to reproduce color. For example, the sky is typically included in an upper image region of the screen (in an upper region of the captured image). Thus, the control unit 34 may weight the upper image region of the screen (captured image) using a larger weight to obtain the received light amount (photometric value P).

(2) The control unit 34 may detect the sky region based on an output (characteristic amount signal F) of the image characteristic amount extraction unit 210, and may execute different aperture control over the sky region. For example, the control unit 34 may determine whether an upper image region of the screen (upper image region of the captured image) includes a white or blue image region with a large area. When determining that the upper image region includes such a white or blue image region, the control unit 34 may, for example, decrease the aperture 12 more than the amount by which the aperture 12 is decreased in normal control (increase the aperture amount of the aperture 12 more than the amount by which the aperture amount is decreased in normal control). In this manner, the control unit 34 may prevent the sky region from being overexposed and failing to reproduce color or maintain the tones of the sky region better. In this case, the control unit 34 may further determine whether the sky is clear or cloudy based on, for example, the area ratio of a white region and a blue region of the image (the area ratio of the image region). The control unit 34 may then reduce the aperture 12 by a greater amount when the sky is clear, and may reduce the aperture 12 by a smaller amount when the sky is cloudy.

(3) The control unit 34 may detect a person's face in the captured image based on an output (characteristic amount signal F) of the image characteristic amount extraction unit 210, and may control the intensity of the local backlight correction executed over the face region. The control unit 34 may increase the correction intensity when the face is extremely dark and decrease the correction intensity when the face is only slightly dark. Further, when the face (or the face image region) has a large area, the main subject of the image that the user intends to capture is likely to be the face. In this case, the control unit 34 may increase the correction intensity of the local backlight correction. When the face has a small area, the main subject of the image that the user intends to capture is less likely to be the person. In this case, the control unit 34 may decrease the correction intensity of the local backlight correction.

(4) The control unit 34 may automatically turn on the local backlight correction (without receiving an instruction from the user) according to the characteristic amount signal F of the input image (image formed using the image data). For example, the captured image may include the sky in the upper image region of the screen and the face in the lower image region of the screen. In this case, the imaging apparatus 100 may have an unfavorable exposure state in which the sky region is overexposed as shown in FIGS. 6O to 6R. In this case, the control unit 34 may automatically turn on the local backlight correction (without receiving an instruction from the user) to obtain an image in which both the sky region and the face region have favorable luminance levels as shown in FIGS. 7O to 7S to 9O to 9S. However, the user may not want the local backlight correction to be turned on automatically without notice (the local backlight correction may be contrary to the user's intension) (for example, the user may intend to capture an image of a person's face in silhouette). To prevent such correction unfavorable to the user, the imaging apparatus 100 may output a message recommending that the user turn on the local backlight correction button to obtain a clearer image. The user may ignore the message or may turn on the local backlight correction as recommended by the message.

Further, the imaging apparatus 100 may preview an image that would be formed through the local backlight correction and an image that would be formed without the local background correction before the imaging apparatus 100 actually forms an image. The user may compare the two images and determine which mode to use according to his or her preference. For example, the imaging apparatus 100 may divide the area of a finder or the screen of an LCD for previewing into a plurality of areas, and display images that would be formed in different modes in these areas. The user may compare the images and select one of the modes by operating a button or touching the LCD screen. The imaging apparatus 100 may start forming an image immediately when the user selects the mode. In addition to whether to turn on and off the local backlight correction, the user may have more choices. For example, the imaging apparatus 100 may have several different modes with different intensities of local backlight correction, and may display, on the LCD screen, thumbnail images of images that would be formed in the different modes. The user may then compare the thumbnail images and select one of the modes.

The finder or the previewing LCD screen of the imaging apparatus 100 may further display a set value (such as an intensity value) of the local backlight correction that is currently being performed. For example, the finder or the LCD screen may display a meter indicating the value of the local backlight correction. The previewing LCD screen of the imaging apparatus 100 may be formed using a touch panel. In this case, the user can directly touch the LCD screen with his or her finger to start or adjust the above operation.

Flowchart

The exposure control of the video camera (imaging apparatus 100) for capturing a moving image according to the present invention and the control of the local backlight correction performed in the video camera will now be described with reference to the functional block diagram of the signal processing unit 31A and the control unit 34 of the imaging apparatus 100 shown in FIG. 10 and a flowchart shown in FIG. 12.

Figure 12:
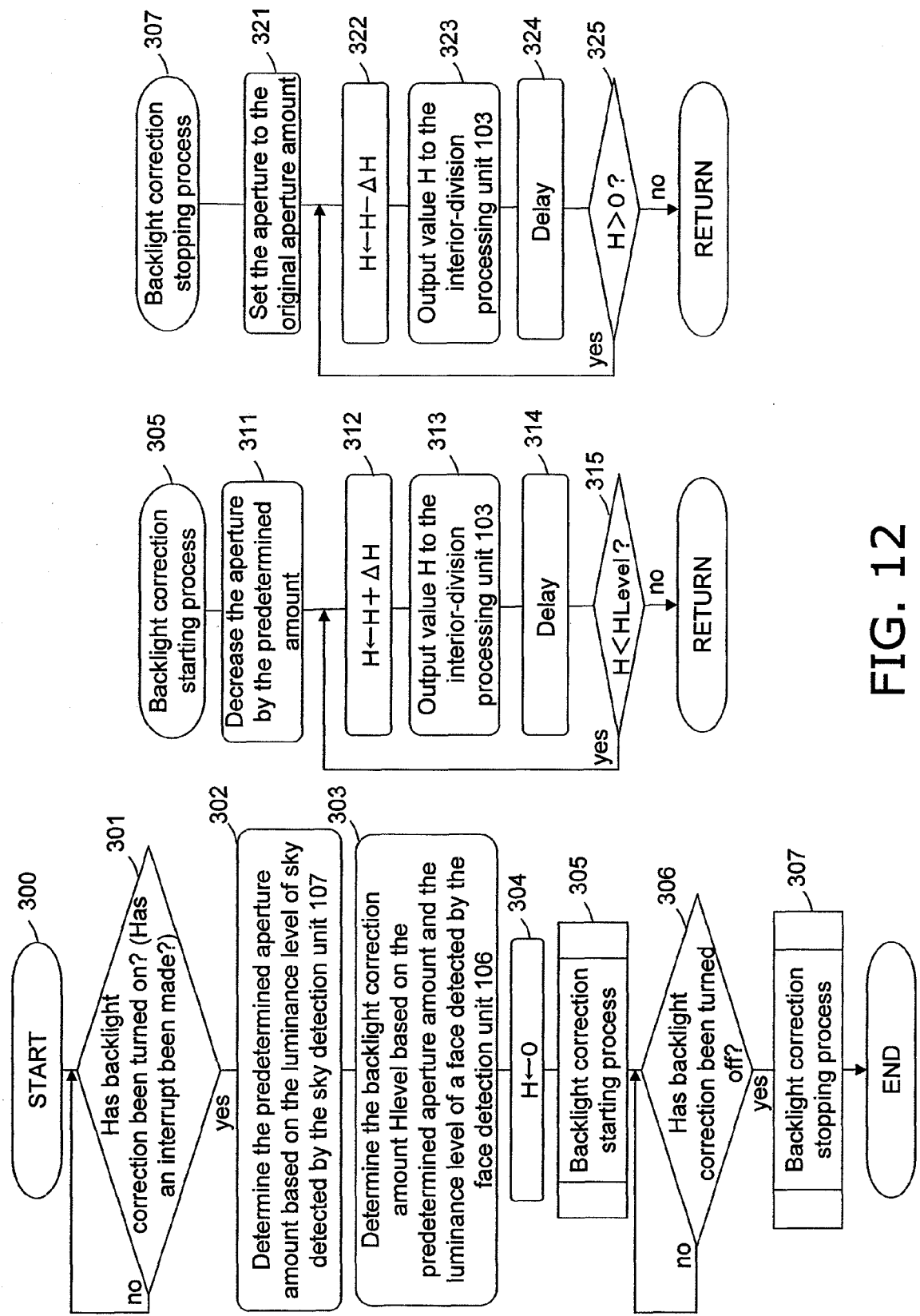
FIG. 12 is a flowchart showing the operation sequence of the imaging apparatus according to the first embodiment.

In FIG. 12, a main flowchart 300 shows the operation of the imaging apparatus 100.

In step S301, the imaging apparatus 100 waits until the user turns on the backlight correction by operating the input unit 7.

In step S302, the imaging apparatus 100 determines a predetermined aperture amount (aperture amount of the aperture 12) based on the luminance level of a sky region of an image detected by the sky detection unit 107.

In step S303, the imaging apparatus 100 determines a backlight correction amount Hlevel based on the predetermined aperture amount determined in step S302 and the luminance level of the face region of the image detected by the face detection unit 106.

In step S304, the imaging apparatus 100 initializes the backlight correction parameter H (sets the parameter H at an initial vale of 0).

In step S305, the imaging apparatus 100 performs a backlight correction starting process. As shown in FIG. 12, the processing in step S305 constitutes a sub-routine, in which the backlight correction is started.

In step S306, the imaging apparatus 100 waits until the user turns off the backlight correction by operating the input unit 37.

In step S307, the imaging apparatus 100 performs a backlight correction stopping process. As shown in FIG. 12, the processing in step S305 constitutes a sub-routine, in which the backlight correction is stopped.

The processing in step S305 (subroutine) to start the backlight correction will now be described.

In step S311, the aperture 12 is decreased to a predetermined aperture amount.

In step S312, the backlight correction parameter H (corresponding to the value of the effect adjustment signal) is increased slightly.

In step S313, the value H is output to the interior-division processing unit 103.

In step S314, the backlight correction is delayed by a predetermined time to provide the timing at which the intensity of the backlight correction is changed. The delay time in step S314 corresponds to the time (delay time) caused by mechanical delay occurring when the aperture amount of the aperture 12 is controlled to the predetermined aperture amount.

In step S315, the backlight correction parameter H (corresponding to the value of the effect adjustment signal) and the backlight correction amount HLevel are compared with each other. When H<HLebel, the processing returns to step S312. The processing in steps S312 to S314 is repeated. When H≧HLevel, the backlight correction starting subroutine ends. The processing then returns to the main flowchart. The backlight correction amount HLevel is normally 1.

The processing in step S307 (subroutine) to stop the backlight correction will now be described.

In step S321, the aperture amount of the aperture 12 is adjusted to the original aperture amount (aperture amount before the backlight correction is started).

In step S322, the backlight correction parameter H (corresponding to the value of the effect adjustment signal) is decreased slightly.

In step S323, the backlight correction parameter H is output to the interior-division processing unit 103.

In step S324, the backlight correction is delayed by a predetermined time to provide the timing at which the intensity of the backlight correction is changed. The delay time in step S324 corresponds to the time (delay time) caused by mechanical delay occurring when the aperture amount of the aperture 12 is controlled to the predetermined aperture amount.

In step S325, the imaging apparatus 100 determines whether the backlight correction parameter H (corresponding to the value of the effect adjustment signal) has reached 0. More specifically, when H>0 in step S325, the processing returns to step S322. The processing in steps S322 to S324 is repeated. When H≦0, the backlight correction stopping process ends. The processing then returns to the main flowchart.

In step S311 in which the aperture is decreased to the predetermined amount, an instruction to decrease the aperture amount of the aperture 12 to the predetermined amount is provided to a controller (not shown), which controls the aperture 12. The controller (not shown) operates in a manner to gradually decrease the aperture amount of the aperture 12 to the predetermined aperture amount. An image captured by the video camera (the imaging apparatus 100 for capturing a moving image) would be unnatural if the aperture is changed to promptly follow instantaneous changes in the luminance level of the scene. To prevent the captured image from being unnatural, the aperture (aperture amount of the aperture 12) needs to be changed gradually.

The loop process from steps S312 to S315 changes the backlight correction parameter H (corresponding to the value of the effect adjustment signal) at substantially the same timings as timings at which the aperture changes (the aperture amount of the aperture 12 changes) gradually. The same applies to the loop process from steps S322 to S325.

The backlight correction parameter H that changes with time is provided to the interior-division processing unit 103 shown in FIG. 2. The interior-division processing unit 103 obtains image data through interior-division processing using a signal (image data) output from the local backlight correction unit 101 and a signal (image data) that is not subjected to the backlight correction. The effect of the backlight correction therefore changes continuously according to the backlight correction parameter H (corresponding to the value of the effect adjustment signal).

In the embodiment described above, the imaging apparatus 100 changes the effect of the backlight correction (correction intensity) using the interior-division processing. However, the local backlight correction unit 101 may change the characteristic (tone conversion characteristic) shown in FIG. 4 and may function to adjust the effect (effect of the local backlight correction) continuously. Alternatively, any means known in the art other than the interior-division processing may be used to adjust the effect of the local backlight correction.

In the present embodiment, the imaging apparatus 100 changes the backlight correction parameter H (corresponding to the value of the effect adjustment signal) linearly through adding or subtracting a difference from the value of the backlight correction parameter H. However, the backlight correction parameter H may be changed in a curve (in stages to reduce the effect of the image processing (local backlight correction) to an ideal value) as shown in FIGS. 9O to 9S.

Although the above embodiment (described with reference to the flowchart shown in FIG. 12) describes the case in which the predetermined aperture amount is determined in step S302, in which the sky detection unit 107 detects the luminance level of the sky, the present invention should not be limited to this structure. For example, the predetermined aperture amount may be determined by the peak detection unit 105 as described above. Also, the predetermined aperture amount may be determined by increasing the photometric value of the photometry unit 104 by a predetermined amount. Alternatively, the predetermined aperture amount may be determined based on the photometric value of the photometry unit 104 obtained when an upper image region of the screen or an upper image region of the captured image is weighted using a greater weight.

Although the above embodiment describes the case in which the backlight correction amount HLevel is determined by the predetermined aperture amount and the face detection unit 106, the present invention should not be limited to this structure. For example, the face detection may be performed in a simple manner. The predetermined aperture amount may be determined based on the photometric value of the photometry unit 104 obtained when a central region of the screen or a center region of the captured image is weighted using a greater weight.

Although step S302 is provided after step S301, in which the imaging apparatus 100 waits until an instruction to turn on the backlight correction is provided, the imaging apparatus 100 may perform the processing in step S302 before step S301.

Second Modification

An imaging apparatus according to a second modification of the present embodiment will now be described.

Figure 13:
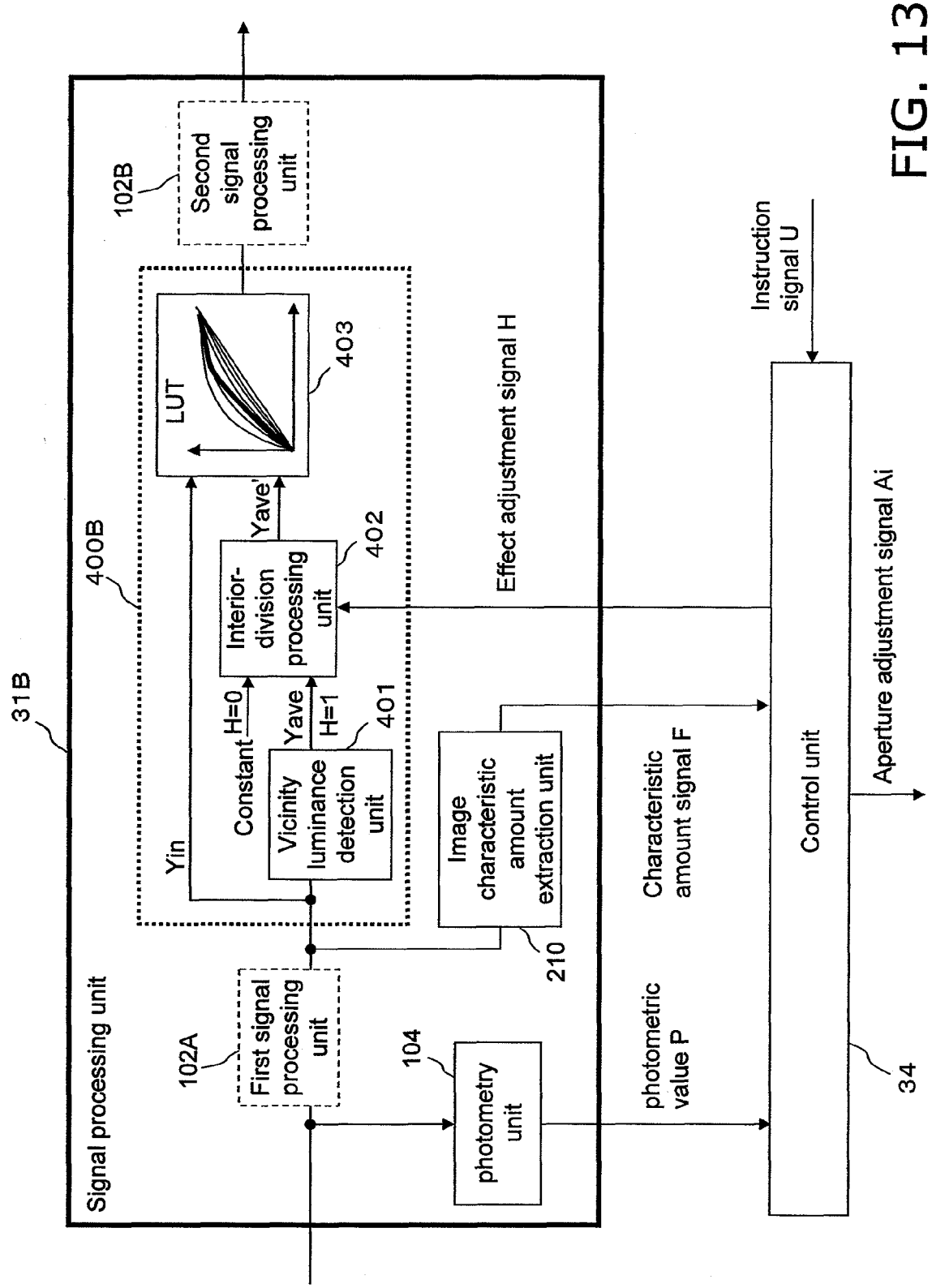
FIG. 13 is a block diagram of a signal processing unit 31B and a control unit 34 according to a second modification of the first embodiment.

FIG. 13 is a functional block diagram of a signal processing unit 31B and a control unit 34 included in the imaging apparatus according to the present modification.

The imaging apparatus of the present modification includes a signal processing unit 31B instead of the signal processing unit 31 (or the signal processing unit 31A) included in the imaging apparatus 100 of the first embodiment. The other structure of the imaging apparatus of the present modification is the same as the structure of the imaging apparatus 100 of the first embodiment, and will not be described in detail.

As shown in FIG. 13, the signal processing unit 31B includes a visualization processing unit 400B instead of the local backlight correction unit 101 and the interior-division processing unit 103 of the signal processing unit 31. An image characteristic amount extraction unit 210 is the same as the image characteristic amount extraction unit 210 of the imaging apparatus according to the first modification. The image characteristic amount extraction unit 210 may be eliminated.

The components of the imaging apparatus of the present modification that are the same as the components in the above embodiment are given the same reference numerals as those components, and will not be described in detail.

The visualization processing unit 400B included in the signal processing unit 31B of the imaging apparatus according to the present modification includes a vicinity luminance detection unit 401, an interior-division processing unit 402, and a two-dimensional LUT 403.

The vicinity luminance detection unit 401 has the same functions as the vicinity luminance detection unit 111 of the first embodiment. The vicinity luminance detection unit 401 receives image data (referred to as image data Yin) output from the first signal processing unit 102A (or the analogue signal processing unit 2 when the first signal processing unit 102A is eliminated), and detects the vicinity luminance level of the input image data and outputs information about the detected vicinity luminance level to the interior-division processing unit 402. More specifically, the vicinity luminance detection unit 401 obtains a representative value (for example, an average value or a weighted average value of values of pixels included in a region surrounding a target pixel) (referred to as image data Yave) of a region that is formed by pixels that are in the vicinity of a processing target pixel (target pixel), and outputs the obtained value Yave to the interior-division processing unit 402.

The interior-division processing unit 402 receives the image data Yave output from the vicinity luminance detection unit 401 and a predetermined constant D1 (described in detail later), and receives the effect adjustment signal (with a value of H) output from the control unit 34. The interior-division processing unit 402 then performs interior-division of the constant D1 and the image data Yave using the value H of the effect adjustment signal as the interior-division ratio. More specifically, the interior-division processing unit 402 calculates the output Yave' of the interior-division processing unit 402 using the formula below.

$$Yave'=Yave+H*(D1-Yave).$$

The interior-division processing unit 402 then outputs the image data Yave' to the two-dimensional LUT 403.

The two-dimensional LUT 403 is a two-dimensional lookup table storing data of the tone conversion characteristic curves that are the same as the tone conversion characteristic curves used in the dynamic tone correction unit 112 of the first embodiment. The two-dimensional LUT 403 receives the image data Yin output from the first signal processing unit 102A (or the analogue signal processing unit 2 when the first signal processing unit 102A is eliminated) and the image data Yave' output from the interior-division processing unit 402. The two-dimensional LUT 403 then selects a tone conversion characteristic curve used to convert the image data Yin (processing target pixel) based on the image data Yave (information about the luminance level of the region surrounding the processing target pixel), and subjects the image data Yin (processing target pixel) to tone conversion using the selected tone conversion characteristic. The image data that has been subjected to the tone conversion performed using the two-dimensional LUT 403 is then output to the second signal processing unit 102B.

One of the two inputs of the two-dimensional LUT input when a tone conversion characteristic curve closest to the knee characteristic is selected from the tone conversion characteristic curves stored in the two-dimensional LUT 403 (input value corresponding to the data Yave') is referred to as a value D1. The value D1 is set as a constant input into the interior-division processing unit 402.

As a result, when the value H of the effect adjustment signal is 0, the input Yave' of the two-dimensional LUT 403 is D1, that is, Yave'=D1. The tone conversion characteristic of the two-dimensional LUT 403 is close to the knee characteristic (knee characteristic using a single curve (single tone conversion characteristic curve)).

More specifically, the visualization processing unit 400B with the above-described structure included in the imaging apparatus of the present modification enables the tone conversion to be performed with the knee characteristic when the value H of the effect adjustment signal is 0. When the value H of the effect adjustment signal is 1, the imaging apparatus processes an image with the visualization processing characteristic (for example, with the local backlight correction characteristic). The intensity of the visualization processing (for example, the local backlight correction) can be adjusted by changing the value H of the effect adjustment signal within a range of 0 to 1.

When the value H of the effect adjustment signal is changed in the same manner as described above (see FIGS. 7O to 7S to 9O to 9S), the imaging apparatus of the present modification also achieves the visualization processing (for example, the local backlight correction) that is performed in a manner interrelated with the aperture control of the imaging apparatus.

The imaging apparatus of the present modification performs the tone conversion with the knee characteristic using the visualization processing unit 400B when the value H of the effect adjustment signal is 0. This enables the imaging apparatus to process even image data (image data signal) with a large dynamic range that is input into the signal processing unit 31B. The dynamic range compression (processing with the knee characteristic) is possible with the visualization processing unit 400B. Thus, the first signal processing unit 102A may eliminate its functional unit that performs the knee adjustment.

Third Modification

An imaging apparatus according to a third modification of the present embodiment will now be described.

Figure 14:
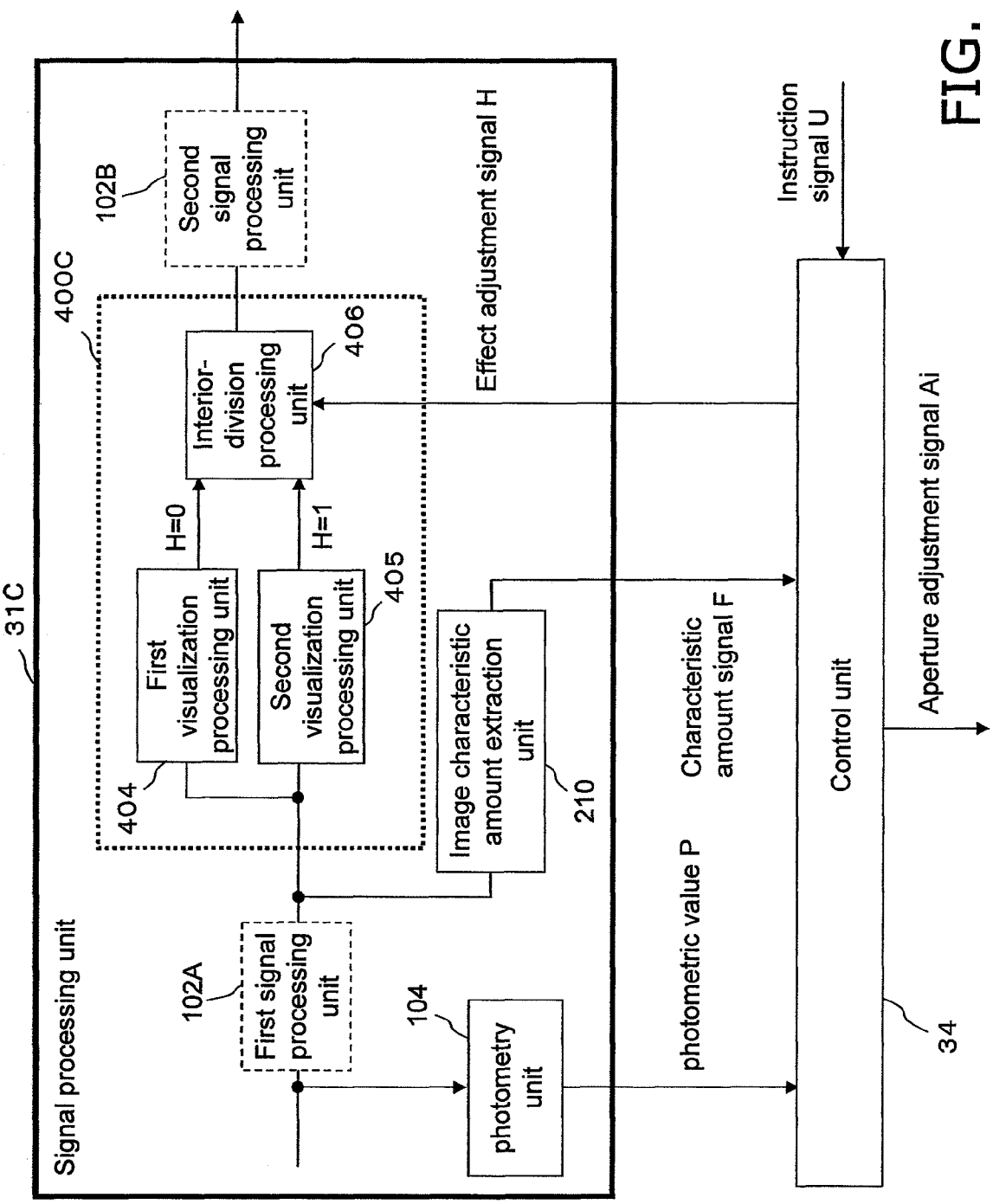
FIG. 14 is a block diagram of a signal processing unit 31C and a control unit 34 according to a third modification of the first embodiment.

FIG. 14 is a functional block diagram of a signal processing unit 31C and a control unit 34 included in the imaging apparatus according to the present modification.

The imaging apparatus of the present modification includes a signal processing unit 31C instead of the signal processing unit 31 (or the signal processing unit 31A) included in the imaging apparatus 100 of the first embodiment. The other structure of the imaging apparatus of the present modification is the same as the structure of the imaging apparatus 100 of the first embodiment, and will not be described in detail.

As shown in FIG. 14, the signal processing unit 31C includes a visualization processing unit 400C instead of the local backlight correction unit 101 and the interior-division processing unit 103 of the signal processing unit 31. An image characteristic amount extraction unit 210 is the same as the image characteristic amount extraction unit 210 of the imaging apparatus according to the first modification. The image characteristic amount extraction unit 210 may be eliminated.

The components of the imaging apparatus of the present modification that are the same as the components in the above embodiment are given the same reference numerals as those components, and will not be described in detail.

The visualization processing unit 400C included in the signal processing unit 31C of the imaging apparatus according to the present modification includes a first visualization processing unit 404, a second visualization processing unit 405, and an interior-division processing unit 406.

It is preferable that a single vicinity luminance detection unit is commonly used as the vicinity luminance detection unit 441 of the first visualization processing unit 404 and as the vicinity luminance detection unit 451 of the second visualization processing unit 405 to reduce the circuit scale of the imaging apparatus, but this will not be described.

The interior-division processing unit 406 receives image data Yin1 output from the first visualization processing unit 404, image data Yin2 output from the second visualization processing unit 405, and an effect adjustment signal output from the control unit 34. The interior-division processing unit 406 subjects the image data Yin1 and the image data Yin2 to interior-division using the value H of the effect adjustment signal as the interior-division ratio. The interior-division processing unit 406 calculates its output image data Yout using the formula below.

$$Yout = Yin1 + H*(Yin2 - Yin1).$$

The interior-division processing unit 406 then outputs the image data Yout to the second signal processing unit 102B.

Figure 15A:
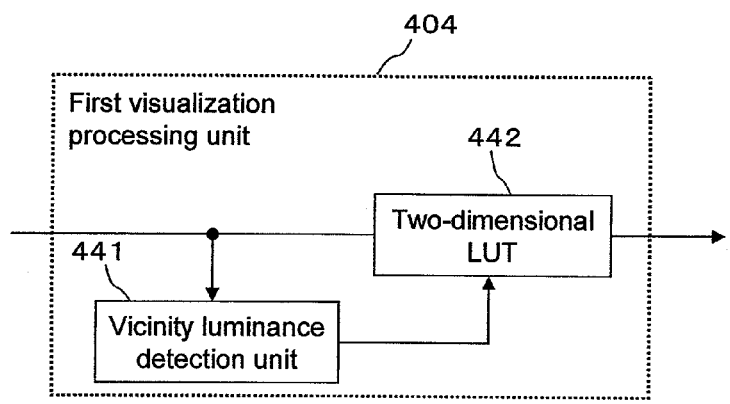
FIGS. 15A and 15B are block diagrams of a first visualization processing unit 404 and a second visualization processing unit 405.
Figure 15B:
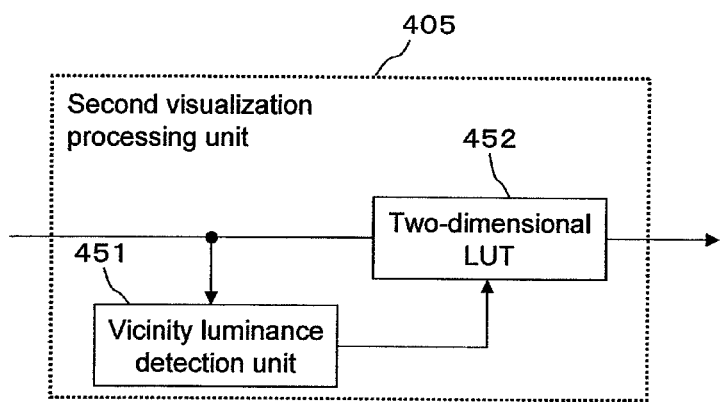

FIGS. 15A and 15B schematically show the structure of the first visualization processing unit 404 and the second visualization processing unit 405.

As shown in FIGS. 15A and 15B, the first visualization processing unit 404 and the second visualization processing unit 405 have the same structure. The structure of the first visualization processing unit 404 and the second visualization processing unit 405 is the same as the structure of the local backlight correction unit of the first embodiment. Two-dimensional LUTs 442 and 452 correspond to the dynamic tone correction unit 112.

The two-dimensional LUT 442 and the two-dimensional LUT 452 subject input image data (corresponding to the value of the processing target pixel) to the tone conversion performed using a tone conversion characteristic that is selected based on the luminance level of a region surrounding a processing target pixel in an image formed using the image data.

In the present modification, the tone conversion characteristics of the two-dimensional LUT 442 and the two-dimensional LUT 452 are set as predetermined characteristics to change the effect of the visualization processing on a processed image.

Specific examples of such characteristics will now be described with reference to FIG. 16.

Example Setting 1

As shown in FIG. 16, the tone conversion characteristic of the two-dimensional LUT 442 included in the first visualization processing unit 404 is set to achieve the knee characteristic and the local contrast characteristic (tone conversion characteristic to maintain (or strengthen) the local contrast), and the tone conversion characteristic of the two-dimensional LUT 452 included in the second visualization processing unit 405 is set to achieve the knee characteristic and the local contrast characteristic (tone conversion characteristic to maintain or strengthen the local contrast) and the backlight correction characteristic. The processing performed under this setting will be described in detail.

In this case, when the value H of the effect adjustment signal is 0, the image data Yin1 output from the first visualization processing unit 404 is used as the output image data Yout of the interior-division processing unit 406. In this case, the output image data Yout has been subjected to the tone conversion performed using the two-dimensional LUT that achieves the knee characteristic and the local contrast characteristic. Thus, the dynamic range of the image data has been compressed through the visualization processing and the local contrast of the image data has been maintained (or strengthened) through the visualization processing.

When the value H of the effect adjustment signal is 1, the image data Yin2 output from the second visualization processing unit 405 is used as the output image data Yout of the interior-division processing unit 406. In this case, the output image data Yout has been subjected to the tone conversion performed using the two-dimensional LUT that achieves the knee characteristic, the local contrast characteristic, and the backlight correction. Thus, the dynamic range of the image data has been compressed through the visualization processing, the local contrast of the image data has been maintained (or strengthened) through the visualization processing, and further the image data has been subjected to the backlight correction.

When the value H of the effect adjustment signal is 0<H<1, the image data that has been subjected to the tone conversion performed using an intermediate characteristic between the characteristics of the above two cases is used as the output image data Yont.

More specifically, the present modification enables the effect (intensity) of the processing based solely on the difference between the tone conversion characteristic of the two-dimensional LUT 442 of the first visualization processing unit 404 and the two-dimensional LUT 452 of the second visualization processing unit 405 (the backlight correction characteristic in the example setting 1) to be adjusted using the effect adjustment signal.

In the same manner as described in the above embodiment (see FIGS. 7O to 7S to 9O to 9S), the imaging apparatus of the present modification also enables the effect (intensity) of the visualization processing (the visualization processing based on the difference between the characteristics of the two-dimensional LUT 442 of the first visualization processing unit 404 and the two-dimensional LUT 452 of the second visualization processing unit (the visualization processing based on the backlight correction characteristic in the example setting 1) by changing the value H of the effect adjustment signal in a manner interrelated with the aperture control of the imaging apparatus.

Example Setting 2

The example setting 2 will now be described.

As shown in FIG. 16, the tone conversion characteristic of the two-dimensional LUT 442 used in the first visualization processing unit 404 is first set to achieve the knee characteristic, and the tone conversion characteristic of the two-dimensional LUT 452 of the second visualization processing unit 405 is set to achieve the knee characteristic and the local contrast characteristic (tone conversion characteristic to maintain or strengthen the local contrast). The processing performed under this setting will be described in detail.

In this case, when the value H of the effect adjustment signal is 0, the image data Yin1 output from the first visualization processing unit 404 is used as the output image data Yout of the interior-division processing unit 406. In this case, the output image data Yout has been subjected to the tone conversion performed using the two-dimensional LUT that achieves the knee characteristic. Thus, the dynamic range of the image data has been compressed through the visualization processing.

When the value H of the effect adjustment signal is 1, the image data Yin2 output from the second visualization processing unit 405 is used as the output image data Yout of the interior-division processing unit 406. In this case, the output image data Yout has been subjected to the tone conversion performed using the two-dimensional LUT that achieves the knee characteristic and the local contrast characteristic. Thus, the dynamic range of the image data has been compressed through the visualization processing, and the local contrast of the image data has been maintained (or strengthened) through the visualization processing.

When the value H of the effect adjustment signal is 0<H<1, the image data that has been subjected to the tone conversion performed using an intermediate characteristic between the characteristics of the above two cases is used as the output image data Yont.

More specifically, the present modification enables the effect (intensity) of the processing based solely on the difference between the tone conversion characteristic of the two-dimensional LUT 442 of the first visualization processing unit 404 and the two-dimensional LUT 452 of the second visualization processing unit 405 (the local contrast characteristic in the example setting 2) to be adjusted using the effect adjustment signal.

In the same manner as described in the above embodiment (see FIGS. 7O to 7S to 9O to 9S), the imaging apparatus of the present modification also enables the effect (intensity) of the processing based on the difference between the characteristics of the two-dimensional LUT 442 of the first visualization processing unit 404 and the two-dimensional LUT 452 of the second visualization processing unit (the visualization processing based on the local contrast characteristic in the example setting 2) by changing the value H of the effect adjustment signal in a manner interrelated with the aperture control of the imaging apparatus.

Example Setting 3

The example setting 3 will now be described.

As shown in FIG. 16, the tone conversion characteristic of the two-dimensional LUT 442 used in the first visualization processing unit 404 is first set to achieve the knee characteristic and the local contrast characteristic, and the tone conversion characteristic of the two-dimensional LUT 452 of the second visualization processing unit 405 is set to achieve the knee characteristic and the backlight correction characteristic. The processing performed under this setting will be described in detail.

In this case, when the value H of the effect adjustment signal is 0, the image data Yin1 output from the first visualization processing unit 404 is used as the output image data Yout of the interior-division processing unit 406. In this case, the output image data Yout has been subjected to the tone conversion performed using the two-dimensional LUT that achieves the knee characteristic and the local contrast characteristic. Thus, the dynamic range of the image data has been compressed through the visualization processing, and the local contrast of the image data has been maintained (or strengthened).

When the value H of the effect adjustment signal is 1, the image data Yin2 output from the second visualization processing unit 405 is used as the output image data Yout of the interior-division processing unit 406. In this case, the output image data Yout has been subjected to the tone conversion performed using the two-dimensional LUT that achieves the knee characteristic and the backlight correction characteristic. Thus, the dynamic range of the image data has been compressed through the visualization processing, and the image data has been subjected to the backlight correction through the visualization processing.

When the value H of the effect adjustment signal is 0<H<1, the image data that has been subjected to the tone conversion performed using an intermediate characteristic between the characteristics of the above two cases is used as the output image data Yont.

More specifically, the present modification enables the effect (intensity) of the processing based solely on the difference between the tone conversion characteristic of the two-dimensional LUT 442 of the first visualization processing unit 404 and the tone conversion characteristic of the two-dimensional LUT 452 of the second visualization processing unit 405 (the local contrast characteristic and the backlight correction characteristic in the example setting 3) to be adjusted using the effect adjustment signal.

When the imaging apparatus is used to capture an image of a person, it is usually preferable to increase the intensity of the backlight correction (effect of the processing). When the imaging apparatus is used to capture an image of a landscape, the need to perform the backlight correction is low, and it is preferable to maintain (or strengthen) the local contrast of the image.

The imaging apparatus of the present modification therefore sets the characteristics of the two-dimensional LUT as the example setting 3. This setting enables, for example, the control unit 34 to determine the state of the captured image based on the characteristic amount signal F, and enables the type and the effect of the visualization processing to be changed using the effect adjustment signal. More specifically, when determining that the main subject of a scene whose image is captured by the imaging apparatus is likely to be a person, the control unit 34 sets the value H of the effect adjustment signal large. The effect adjustment signal whose value H is set large increases the effect of the visualization processing based on the backlight correction characteristic. When determining that the main subject of a scene whose image is captured by the imaging apparatus is likely to be a landscape, the control unit 34 sets the value H of the effect adjustment signal small. The effect adjustment signal whose value H is set small increases the effect of the visualization processing based on the local contrast characteristic.

Fourth Modification

An imaging apparatus according to a fourth modification of the present embodiment will now be described.

Figure 17:
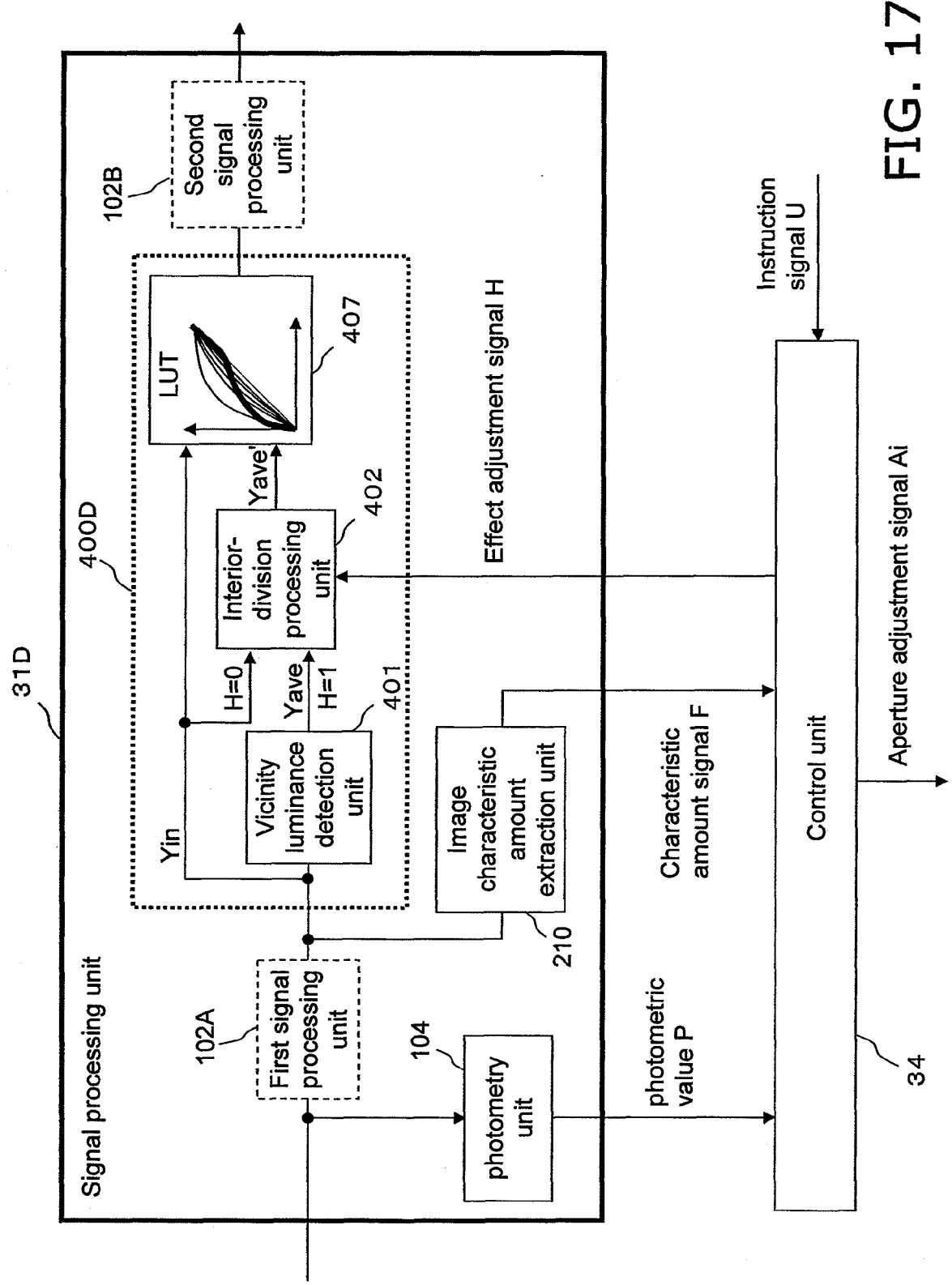
FIG. 17 is a block diagram of a signal processing unit 31D and a control unit 34 according to a fourth modification of the first embodiment.
Figure 18:
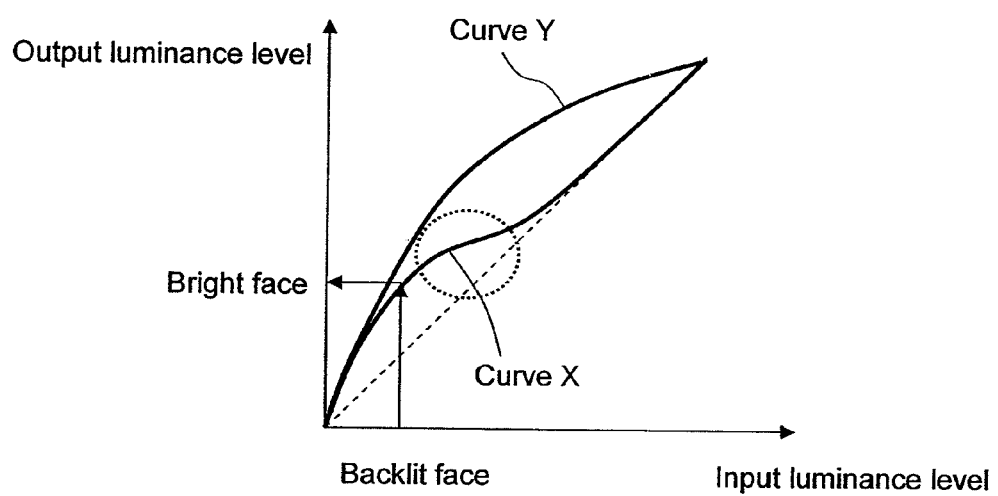
FIG. 18 is a diagram describing conventional backlight correction.
Figure 19:
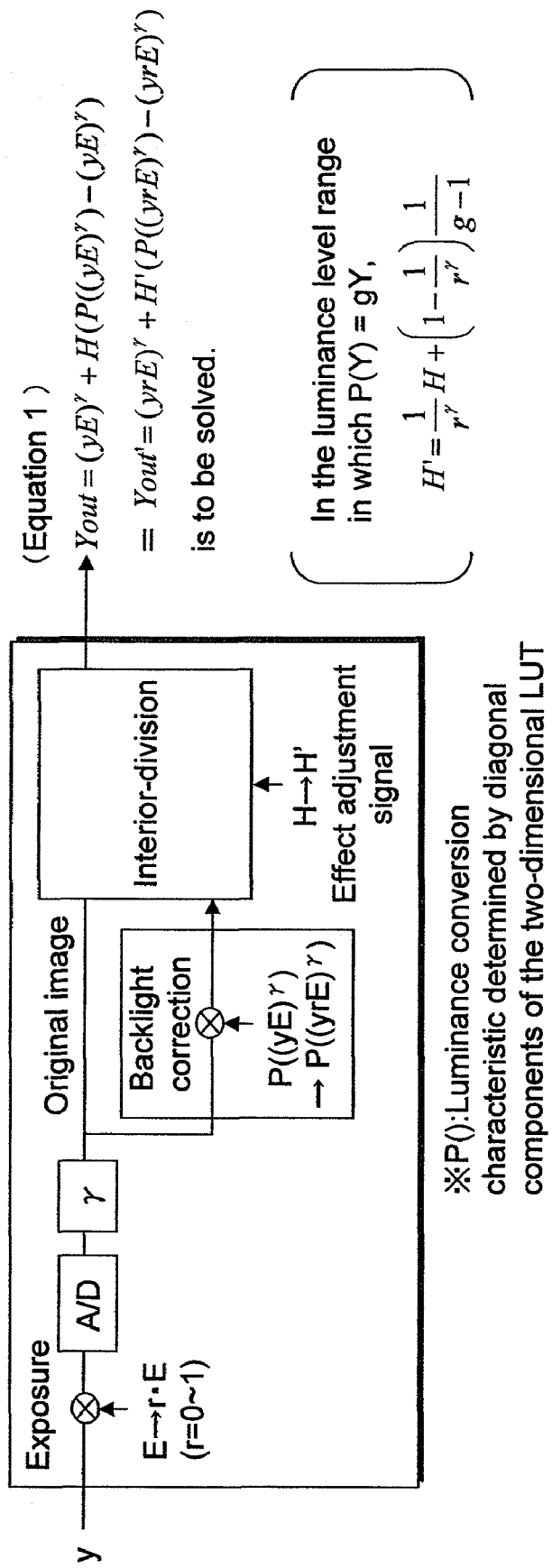
FIG. 19 is a diagram describing the basic principle of aperture cancellation using an effect adjustment signal.

FIG. 17 is a functional block diagram of a signal processing unit 31D and a control unit 34 included in the imaging apparatus according to the fourth modification.

The imaging apparatus of the present modification includes a signal processing unit 31D instead of the signal processing unit 31 (or the signal processing unit 31A) included in the imaging apparatus 100 of the first embodiment. The other structure of the imaging apparatus of the present modification is the same as the structure of the imaging apparatus 100 of the first embodiment, and will not be described in detail.

As shown in FIG. 17, the signal processing unit 31D includes a visualization processing unit 400D instead of the local backlight correction unit 101 and the interior-division processing unit 103 of the signal processing unit 31. An image characteristic amount extraction unit 210 is the same as the image characteristic amount extraction unit 210 of the imaging apparatus according to the first modification. The image characteristic amount extraction unit 210 may be eliminated.

The components of the imaging apparatus of the present modification that are the same as the components in the above embodiment are given the same reference numerals as those components, and will not be described in detail.

The visualization processing unit 400D included in the signal processing unit 31D of the imaging apparatus according to the present modification includes a vicinity luminance detection unit 401, an interior-division processing unit 402, and a two-dimensional LUT 407.

The vicinity luminance detection unit 401 and the interior-division processing unit 402 are the same as the corresponding components of the visualization processing unit 400B of the second modification, except that one of the two inputs of the interior-division processing unit 402 is not a constant but is image data Yin.

The interior-division processing unit 402 of the present modification receives image data Yave output from the vicinity luminance detection unit 401, image data Yin output from the first signal processing unit 102A, and the effect adjustment signal output from the control unit 34. The interior-division processing unit 402 subjects the image data Yin and the image data Yave to interior-division processing using the value H of the effect adjustment signal as the interior-division ratio. More specifically, the interior-division processing unit 402 calculates its output image data Yave' using the formula below.

$$Yave' = Yave + H*(Yin - Yave).$$

The interior-division processing unit then outputs the image data Yave' to the two-dimensional LUT 407.

The two-dimensional LUT 407 is a two-dimensional lookup table storing data of the tone conversion characteristic curves that are the same as the tone conversion characteristic curves of the dynamic tone correction unit 112 of the first embodiment. The two-dimensional LUT 407 receives the image data Yin output from the first signal processing unit 102A (or the analogue signal processing unit 2 when the first signal processing unit 102A is eliminated) and the image data Yave' output from the interior-division processing unit 402. The two-dimensional LUT 407 selects a tone conversion characteristic curve used to convert the image data Yin (processing target pixel) based on the image data Yave (information about the luminance level of the region surrounding the processing target pixel), and subjects the image data Yin (processing target pixel) to the tone conversion performed using the selected tone conversion characteristic curve. The image data resulting from the tone conversion performed using the two-dimensional LUT 403 is then output to the second signal processing unit 102B.

Among the tone conversion characteristics stored in the two-dimensional LUT 407, the tone conversion characteristic with diagonal components (tone conversion characteristic used when the two-input values of the two-dimensional LUT are identical to each other) is set as a predetermined characteristic (for example, a backlight correction characteristic). When the value H of the effect adjustment signal is 0, the tone conversion using the two-dimensional LUT is performed based on the predetermined characteristic.

More specifically, the visualization processing unit 400B with the above-described structure included in the imaging apparatus of the present modification achieves the tone conversion performed using the tone conversion characteristic determined by the diagonal components of the two-dimensional LUT 407 (tone conversion using a single curve (tone conversion characteristic)) when the value H of the effect adjustment signal is 0. When the value H of the effect adjustment signal is 1, the imaging apparatus achieves the visualization processing characteristic (local backlight correction characteristic). Further, the intensity of the visualization processing (local contrast correction) can be adjusted by changing the value H of the effect adjustment signal within a range of 0 to 1.

The imaging apparatus of the present modification also performs the visualization processing (local contrast correction) in a manner interrelated with the aperture control of the imaging apparatus when the value H of the effect adjustment signal is changed in the same manner as described above (see FIGS. 7O to 7S to 9O to 9S).

Other Embodiments

The signal processing unit 31 (31A to 31D) described in the above embodiment may be achieved by hardware using a digital circuit, such as an integrated circuit that functions as an imaging apparatus, in which other camera signal processing functions are incorporated, or may be achieved by incorporated software using a central processing unit (hereafter, CPU) included in the integrated circuit, or may be achieved by application software executed on an independent computer. The functions described above may be implemented by both software and hardware. When the above functions are implemented by hardware, the functions described in the above embodiment may be implemented by separate integrated circuits, or some or all of the functions may be implemented by a single-chip integrated circuit. The integrated circuit that functions as an imaging apparatus should not be limited to an LSI (large scale integrated) circuit. The integrated circuit may be referred to as an IC (integrated circuit), a system LSI, a super LSI circuit, or an ultra LSI circuit depending on the degree of integration of the circuit. The integrated circuit may be formed by a dedicated circuit or a general-purpose processor. For example, the integrated circuit may be an FPGA (field programmable gate array), which is an integrated circuit programmable after the semiconductor chip is manufactured, or a reconfigurable processor, which is an integrated circuit in which internal circuit cells are reconfigurable or more specifically internal circuit cells can be reconnected or reset. If any circuit integration technology emerges as an advancement of the semiconductor technology or as a derivative of the semiconductor technology, the technology may be used to integrate the functional blocks of the imaging apparatus. For example, biocomputers may become applicable with the advancement of biotechnology. The application software may not be stored in a recording medium, such as a disk, when distributed. Alternatively, the software may be downloaded via a network.

Although the above embodiment of the present invention describes the case in which imaging lens 11 is formed by a single lens, the imaging lens 11 may be formed by a plurality of lenses.

The shutter, which is not shown, may be a mechanical shutter, or may be an electronic shutter that adjusts the amount of light by adjusting the driving timing of the image sensor of the imaging unit 13.

The A/D converter 23 may be arranged separately from the analogue signal processing unit 2, or may be incorporated in the digital signal processing unit 3. The image sensor of the imaging unit 13 may be an image sensor with another structure, such as a CMOS image sensor. The structure of the image sensor of the imaging unit 13 should not be limited to a single-sensor structure, but may be a triple-sensor structure.

The face detection unit 106 may detect a face region using various other algorithms known in the art. For example, the face detection unit 106 may use pattern matching based on learning to detect the face region using the face line or the arrangement of the mouth, eyes, and nose, or may use color information, such as skin color information, to detect the face region.

Although the above embodiment of the present invention describes the case in which the aperture amount of the aperture 12 is changed to adjust the exposure light amount of the imaging apparatus, the exposure light amount of the imaging apparatus may be adjusted by adjusting the time for which the mechanical shutter or the electronic shutter is set open. The imaging apparatus with this structure has the same advantageous effects as described above. When the exposure light amount fails to reach a necessary amount of exposure light by setting both the shutter and the aperture at maximum values, one or both of the analogue signal processing unit 2 and the digital signal processing unit 3 may amplify the image signal (image data) using a gain.

The structures described in detail in the above embodiment are mere examples of the present invention, and may be changed and modified variously without departing from the scope and spirit of the invention.

APPENDIXES

The present invention may also be expressed as follows.

Appendix 1

An imaging apparatus for electronically capturing an image of a subject, comprising:
an optical system with a light amount adjustment function;
an image sensor operable to read an optical image of a subject that is formed with light focused by the optical system;
a backlight correction unit operable to at least increase a luminance level of a dark region of an image output from the image sensor using a conversion characteristic that is selected differently according to a spatial position in the image;
an instruction unit operable to instruct to start backlight correction performed by the backlight correction unit; and
a control unit operable to operate the backlight correction unit when instructed to start the backlight correction by the instruction unit, and decrease an amount of light received by the optical system by a predetermined amount.

Appendix 2

The imaging apparatus according to appendix 1, wherein the control unit increases a correction amount of the backlight correction unit in stages according to an amount of change in a direction in which an exposure light amount of the optical system is decreased.

Appendix 3

The imaging apparatus according to one of appendixes 1 and 2, further comprising:
a peak detection unit operable to extract, from image data, a luminance level at a position at which a luminance level of an image formed by the image data is highest,
wherein the control unit decreases an exposure light amount of the optical system at least according to an amount of increase of the luminance level detected by the peak detection unit.

Appendix 4

The imaging apparatus according to one of appendixes 1 and 2, further comprising:
a sky detection unit operable to extract a region indicating sky from input image data,
wherein the control unit decreases an exposure light amount of the optical system at least according to a luminance level of the region detected by the sky detection unit.

Appendix 5

The imaging apparatus according to one of appendixes 1 to 5, further comprising:
a face detection unit operable to extract a face region indicating a face from an image,
wherein the control unit changes a correction intensity of the backlight correction unit at least according to a luminance level of the face region of the image detected by the face detection unit.

Appendix 6

The imaging apparatus according to one of appendixes 1 and 2, further comprising:

a divisional photometry unit operable to divide a scene into a plurality of areas, measures light corresponding to each area, and determine a reference exposure light amount of the optical system, wherein the divisional photometry unit changes a photometric weight used to weight each area based on an instruction to start the backlight correction provided by the instruction unit.

Appendix 7

An imaging method used in an imaging apparatus that includes an optical system with a light amount adjustment function, an image sensor, and an A/D converter, the method comprising:

measuring light of a scene and determine a reference exposure light amount of the optical system;

determining whether an instruction is provided from a user;

performing backlight correction using a conversion characteristic that is selected differently according to a spatial position in an image; and decreasing an exposure light amount further from the reference exposure light amount.

Appendix 8

The imaging method according to appendix 6, wherein in the step of performing the backlight correction, a correction amount of the backlight correction unit is changed continuously according to a rate of change of the exposure light amount of the optical system in the step of decreasing the exposure light amount.

Appendix 9

An integrated circuit used in an imaging apparatus that includes an optical system with a light amount adjustment function, an image sensor, and an A/D converter, the integrated circuit comprising:

a backlight correction unit operable to at least increase a luminance level of a dark region of an image read by the A/D converter using a conversion characteristic that is selected differently according to a spatial position in the image; and a control unit operable to operate the backlight correction unit when instructed by a user and decrease a light amount of the optical system by a predetermined amount. cl Appendix 10

A program implemented by a processor used in an imaging apparatus, the program enabling the processor to:

measure light of a scene and determine a reference exposure light amount of the optical system;

determine whether an instruction is provided from a user;

perform backlight correction using a conversion characteristic that is selected differently according to a spatial position in an image; and output a control signal for decreasing an exposure light amount further from the reference exposure light amount.

Appendix 11

An imaging apparatus for electronically capturing an image of a subject, comprising:

an optical system with a light amount adjustment function operable to focus light from a subject;

an imaging unit operable to read an optical image of the subject that is formed with the light focused by the optical system, and obtain the read optical image as an image signal;

a backlight correction unit operable to perform backlight correction of the image signal by performing tone conversion of converting a tone of a processing target pixel that is included in an image formed by the image signal using a conversion characteristic that is selected differently according to a spatial position of the processing target pixel in the image, wherein the tone conversion is performed in a manner to at least increase a luminance level of a dark image region of the image; and a control unit operable to decrease an exposure light amount of the imaging unit by a predetermined amount according to an intensity of the backlight correction unit

INDUSTRIAL APPLICABILITY

The imaging apparatus, the imaging method, the storage medium storing the program, and the integrated circuit of the present invention are applicable not only to digital still cameras, but also to other imaging apparatuses that capture images, such as video cameras, built-in cameras of mobile telephones, monitoring cameras, security cameras, and cameras incorporated in the eyes of robots, and are also applicable to application software, such as RAW converter software and photo retouching software for digital still cameras. Thus, the imaging apparatus, the imaging method, the storage medium storing the program, and the integrated circuit of the present invention are useful in the video equipment related industry and have applicability in such industry.

What is claimed is:

1. An imaging apparatus for electronically capturing an image of a subject, comprising:
    an optical system with a light amount adjustment function operable to focus light from a subject;
    an imaging unit operable to read an optical image of the subject that is formed with the light focused by the optical system, and obtain the read optical image as an image signal;
    a backlight correction unit operable to perform backlight correction of the image signal by performing tone conversion of converting a tone of a processing target pixel that is included in an image formed by the image signal using a conversion characteristic that is selected differently according to a spatial position of the processing target pixel in the image, wherein the tone conversion is performed in a manner to at least increase a luminance level of a dark image region of the image;
    an instruction unit operable to output an instruction signal instructing to start the backlight correction performed by the backlight correction unit; and
    a control unit operable to start the backlight correction based on the instruction signal output from the instruction unit, and adjust an amount of light in the optical system by decreasing an exposure light amount of the imaging unit by a predetermined amount.

2. The imaging apparatus according to claim 1,
    wherein the control unit increases a level of an effect adjustment signal for adjusting an intensity of the backlight correction performed by the backlight correction unit according to the decrease amount of the exposure light amount of the optical system, and
    the backlight correction unit performs the backlight correction with the intensity adjusted based on the effect adjustment signal.

3. The imaging apparatus according to claim 2,
wherein the control unit estimates the exposure light amount $A^\wedge(t)$ using the following formula:

$$A^\wedge(t)=A^\wedge(t-1)+\alpha*(A(t)-A^\wedge(t-1)),$$

where $A(t)$ is a set exposure amount of the optical system and $\alpha$ is a predetermined time constant, and $0 \leq \alpha \leq 1$, and
the control unit calculates the effect adjustment signal $H(t)$ using the following formula:

$$H(t)=H0+(1-H0)*(\Delta A^\wedge A(t)/\Delta A\max),$$

where $\Delta A^\wedge(t)$ is the decrease amount of the exposure light amount and $\Delta A\max$ is a predetermined maximum decrease amount of the exposure light amount, and $H0$ is a value of the effect adjustment signal when $\Delta A^\wedge(t)=0$.

4. The imaging apparatus according to claim 2,
wherein the backlight correction unit performs the backlight correction by outputting an output image signal Yout calculated using the following formula:

$$Yout=(1-H)*Yin1+H*Yin2,$$

where Yin1 is an uncorrected image signal that is the image signal yet to be subjected to backlight correction, Yin2 is a corrected image signal that is the image signal already subjected to backlight correction, and H is the effect adjustment signal, and $0 \leq H \leq 1$.

5. The imaging apparatus according to claim 2,
wherein the backlight correction unit adjusts an intensity of only a backlight correction function by outputting an output image signal Yout calculated using the following formula:

$$Yout=(1-H)*LUT1(Yin,Yave)+H*LUT2(Yin,Yave),$$

where Yin is a luminance level of the target pixel, Yave is a vicinity luminance level that is a luminance level of a region surrounding the target pixel, LUT1(Yin, Yave) is an output signal of a two-dimensional lookup table 1 that has no backlight correction function, LUT2(Yin, Yave) is an output signal of a two-dimensional lookup table 2 that has a backlight correction function, and H is the effect adjustment signal, and $0 \leq H \leq 1$.

6. The imaging apparatus according to claim 1, further comprising:
a photometry unit operable to generate a photometric value indicating an amount of light that is received by the imaging unit,
wherein the control unit generates an effect adjustment signal for adjusting an intensity of the backlight correction performed by the backlight correction unit based on the photometric value, and
the backlight correction unit performs the backlight correction with the intensity determined based on the effect adjustment signal.

7. The imaging apparatus according to claim 6,
wherein the control unit calculates the effect adjustment signal $H(t)$ using the following formula:

$$H^\wedge(t)=H0+(1-H0)*(\Delta P(t)/\Delta P\max),$$

where $\Delta P(t)$ is a decrease amount of the photometric value and $\Delta P\max$ is a predetermined maximum decrease amount of the photometric value, and $H0$ is a value of the effect adjustment signal when $\Delta P(t)=0$.

8. The imaging apparatus according to claim 6,
wherein the photometry unit divides the image formed by the image signal into a plurality of image regions, and measures a light amount corresponding to each image region to generate the photometric value indicating the amount of light received by the imaging unit and determine a reference exposure amount for adjusting the light amount of the optical system, and
the control unit changes a photometric weight used to weight each image region based on an instruction signal output from the instruction unit and obtains the photometric value, and adjusts the light amount of the optical system based on the obtained photometric value.

9. The imaging apparatus according to claim 1, further comprising:
a noise-reduction processing unit operable to perform noise-reduction processing of reducing noise of the image signal or an output image signal of the backlight correction unit,
wherein the control unit increases an intensity of the noise-reduction processing unit according to the decrease amount of the exposure light amount of the optical system.

10. The imaging apparatus according to claim 9,
wherein the backlight correction unit calculates a vicinity luminance level that is a luminance level of a region surrounding the target pixel, and
the noise-reduction processing unit further increases an intensity of the noise-reduction processing of a pixel whose vicinity luminance level is low.

11. The imaging apparatus according to claim 1, further comprising:
a peak detection unit operable to detect a peak luminance level of the image formed by the image signal based on the image signal,
wherein the control unit decreases the exposure light amount of the imaging unit by adjusting the light amount of the optical system at least according to the peak luminance level detected by the peak detection unit.

12. The imaging apparatus according to claim 1, further comprising:
a sky detection unit operable to extract an image region indicating sky from the image formed by the image signal,
wherein the control unit decreases the exposure light amount of the imaging unit by adjusting the light amount of the optical system at least according to a luminance level of the image region indicating the sky detected by the sky detection unit.

13. The imaging apparatus according to claim 1, further comprising:
a face detection unit operable to extract a face region indicating a face of a person from the image formed by the image signal,
wherein the control unit changes an intensity of correction performed by the backlight correction unit at least according to a luminance level of the face region detected by the face detection unit.

14. An imaging method used in an imaging apparatus that includes an optical system with a light amount adjustment function operable to focus light from a subject and an imaging unit operable to read an optical image of the subject that is formed with the light focused by the optical system and obtain the read optical image as an image signal, the method comprising:
performing backlight correction of the image signal by performing tone conversion of converting a tone of a processing target pixel that is included in an image formed by the image signal using a conversion characteristic that is selected differently according to a spatial position of the processing target pixel in the image, wherein the tone conversion is performed in a manner to at least increase a luminance level of a dark image region of the image;

determining whether an instruction signal instructing to start the backlight correction performed in the backlight correction step is received; and starting the backlight correction in the backlight correction step based on the instruction signal output in the instruction determination step, and adjusting an amount of light in the optical system by decreasing an exposure light amount of the imaging unit by a predetermined amount.

15. A non-transitory computer-readable storage medium enabling a computer to implement an imaging method used in an imaging apparatus that includes an optical system with a light amount adjustment function operable to focus light from a subject and an imaging unit operable to read an optical image of the subject that is formed with the light focused by the optical system and obtain the read optical image as an image signal, the program enabling the computer to:

perform backlight correction of the image signal by performing tone conversion of converting a tone of a processing target pixel that is included in an image formed by the image signal using a conversion characteristic that is selected differently according to a spatial position of the processing target pixel in the image, wherein the tone conversion is performed in a manner to at least increase a luminance level of a dark image region of the image;

determine whether an instruction signal instructing to start the backlight correction performed in the backlight correction step is received; and start the backlight correction in the backlight correction step based on the instruction signal output in the instruction determination step, and adjust an amount of light in the optical system by decreasing an exposure light amount of the imaging unit by a predetermined amount.

16. An integrated circuit used in an imaging apparatus that includes an optical system with a light amount adjustment function operable to focus light from a subject and an imaging unit operable to read an optical image of the subject that is formed with the light focused by the optical system and obtain the read optical image as an image signal, the integrated circuit comprising:

a backlight correction unit operable to perform backlight correction of the image signal by performing tone conversion of converting a tone of a processing target pixel that is included in an image formed by the image signal using a conversion characteristic that is selected differently according to a spatial position of the processing target pixel in the image, wherein the tone conversion is performed in a manner to at least increase a luminance level of a dark image region of the image;

an instruction unit operable to output an instruction signal instructing to start the backlight correction performed by the backlight correction unit; and a control unit operable to start the backlight correction based on the instruction signal output from the instruction unit, and adjust an amount of light in the optical system by decreasing an exposure light amount of the imaging unit by a predetermined amount.

* * * * *